(12) United States Patent
Kouda

(10) Patent No.: US 6,779,777 B2
(45) Date of Patent: Aug. 24, 2004

(54) PIPE COUPLING SOCKET

(75) Inventor: Toru Kouda, Tokyo (JP)

(73) Assignee: Nitto Kohki Co., Ltd (JP)

( * ) Notice: Subject to any disclaimer, the term of this patent is extended or adjusted under 35 U.S.C. 154(b) by 0 days.

(21) Appl. No.: 10/622,906

(22) Filed: Jul. 18, 2003

(65) Prior Publication Data

US 2004/0016900 A1 Jan. 29, 2004

Related U.S. Application Data

(63) Continuation of application No. PCT/JP01/00335, filed on Jan. 19, 2001.

(51) Int. Cl.$^7$ ............................ F16L 37/22; F16L 37/38
(52) U.S. Cl. ............................. 251/149.6; 137/614.05; 251/149.9
(58) Field of Search .............................. 251/149–149.9; 137/614–614.06

(56) References Cited

U.S. PATENT DOCUMENTS

| | | | |
|---|---|---|---|
| 1,331,025 A | 2/1920 | Riggin | |
| 3,618,892 A | 11/1971 | Scluto, Jr. | |
| RE27,364 E | 5/1972 | German | |
| 4,627,598 A | 12/1986 | Fremy | |
| 5,090,448 A | 2/1992 | Truchet | |
| 5,290,009 A | 3/1994 | Heilmann | |
| 5,323,812 A | * 6/1994 | Wayne | ............... 137/614.05 |
| 5,494,073 A | 2/1996 | Saito | |
| 5,540,250 A | 7/1996 | Mullins | |
| 5,730,185 A | * 3/1998 | Wilkins et al. | .......... 137/614.2 |
| 5,884,897 A | 3/1999 | Arosio | |
| 6,283,443 B1 | * 9/2001 | Taneya | ................... 251/149.6 |

FOREIGN PATENT DOCUMENTS

| | | |
|---|---|---|
| JP | 62-180193 | 8/1987 |
| JP | 64-003393 | 1/1989 |
| JP | 64-006593 | 1/1989 |
| JP | 4-211793 | 8/1992 |
| JP | 11-108279 | 4/1999 |

* cited by examiner

*Primary Examiner*—Paul J. Hirsch
(74) *Attorney, Agent, or Firm*—Dickstein, Shapiro, Morin & Oshinsky, LLP.

(57) ABSTRACT

The present invention provides a pipe coupling socket that enjoys improved safety when connected to a plug. This socket comprises a socket body containing a ball valve and having locking elements at its distal end portion, a valve control sleeve fitted on the outer peripheral surface of the socket body for axial movement and capable of actuating the ball valve, a plug connecting sleeve fitted on the outer peripheral surface of the socket body for axial movement and capable of locking and unlocking the plug with the aid of the locking elements, first lock means which prevents the advance of the plug connecting sleeve, second lock means which prevents the retreat of the plug connecting sleeve and the advance of the valve control sleeve, and third lock means which prevents the retreat of the plug connecting sleeve and the valve control sleeve.

8 Claims, 15 Drawing Sheets

PIPE COUPLING SOCKET

CROSS-REFERENCE TO RELATED APPLICATIONS

This is a Continuation Application of PCT Application No. PCT/JP01/00335, filed Jan. 19, 2001, which was not published under PCT Article 21(2) in English.

BACKGROUND OF THE INVENTION

1. Field of the Invention

The present invention relates to a pipe coupling socket which uses a ball valve as a valving element and to or from which a plug can be attached or detached speedily and easily, and more particularly, to a pipe coupling socket suited for the connection between an air tool or the like and piping.

2. Description of the Related Art

Conventional pipe coupling sockets of this type are described in Jpn. Pat. Appln. KOKAI Publication No. 11-108279 and U.S. Pat. No. 3,423,063, for example.

If a plug is inserted into a plug inlet of the pipe coupling socket described in Jpn. Pat. Appln. KOKAI Publication No. 11-108279, in connecting the plug, a plug connecting sleeve and a valve control sleeve, having so far been retreated, advance. Thereupon, the plug is locked by means of the plug connecting sleeve, and a valve is opened by means of the valve control sleeve. In disconnecting the valve, the valve control sleeve is retreated, the valve is closed in the middle of the retreat, and a fluid in the plug is discharged to the outside. If the valve control sleeve is retreated further, the plug connecting sleeve retreats to unlock the plug, whereupon the plug can be disconnected from the pipe coupling socket.

If a plug is inserted into a plug inlet of the pipe coupling socket described in U.S. Pat. No. 3,423,063, in connecting the plug, on the other hand, a plug connecting sleeve, having so far been retreated, advances to lock the plug. If a valve control sleeve is advanced thereafter, the valve is opened. In disconnecting the plug, the valve is closed by retreating the valve control sleeve, and a fluid in the plug is discharged to the outside. If the plug connecting sleeve is retreated thereafter, the plug is unlocked, whereupon the plug can be disconnected from the pipe coupling socket.

Further, either of the pipe coupling sockets described in Jpn. Pat. Appln. KOKAI Publication No. 11-108279 and U.S. Pat. No. 3,423,063 is designed so that the valve control sleeve cannot be advanced, that is, the valve cannot be opened, unless the plug control sleeve is advanced. Means for holding the plug control sleeve in the retreated position shares lock balls with lock means for locking the plug. When the plug is not connected, the plug control sleeve engages the lock balls on the centrifugal side and is prevented from advancing. As the lock balls move to the centripetal direction when the plug is connected, the engagement is canceled, whereupon the plug control sleeve advances.

These pipe coupling sockets may be used for the connection of air piping and an air tool. In moving the air tool to another neighboring job site, regarding the pipe coupling socket described in Jpn. Pat. Appln. KOKAI Publication No. 11-108279, the plug connecting sleeve also retreats to cause the plug to be disconnected inevitably if the valve control sleeve is retreated to close the valve. Thus, the pipe coupling socket and the plug cannot be connected with the valve closed. Therefore, the plug may be either kept connected or disconnected as the tool is moved. In the former case, the valve is open, so the air tool may be accidentally actuated and cause injury while the air tool is being moved. Although the latter case is free from this problem, it is subject to a problem that the plug must be connected again at a destination, which is troublesome.

Since the valve control sleeve that is advanced to open the valve is allowed to retreat, moreover, the valve control sleeve may possibly run against some surrounding obstacles and retreat during the operation of the air tool, thereby causing the valve and the plug to be closed and disconnected, respectively.

In the case of the pipe coupling socket described in U.S. Pat. No. 3,423,063, furthermore, the pipe coupling socket and the plug can be connected in a manner such that only the valve control sleeve is retreated to close the valve. Since the valve control sleeve can advance, however, there is a problem that the valve control sleeve may possibly run against some surrounding obstacles and advance as the air tool moves, thereby causing the valve to open.

Further, either of the pipe coupling sockets described in Jpn. Pat. Appln. KOKAI Publication No. 11-108279 and U.S. Pat. No. 3,423,063 shares the same lock balls with the lock means for locking the plug as means for holding the plug control sleeve in the retreated position. Therefore, the lock balls may possibly move to the centripetal direction with the plug connected only partially to a pipe coupling. In this case, the plug control sleeve inevitably advances despite the partial connection of the plug, thus the valve control sleeve is unavoidably allowed to advance.

BRIEF SUMMARY OF THE INVENTION

An object of the present invention is to provide a pipe coupling socket provided with lock means that prevents the advance and retreat of a valve control sleeve and a plug connecting sleeve, whereby safety is improved.

Another object of the present invention is to provide a pipe coupling socket in which the advance of a plug connecting sleeve is prevented so that a valve cannot be opened by means of a valve control sleeve if valve connection is partial, whereby safety is improved.

Another object of the present invention is to provide a pipe coupling socket in which seal valve-seats are prevented from being pressed to the ball valve under a fluid pressure. This ensures the durability of the seal valve-seats and the perfection of sealing.

In order to achieve the above objects, the invention according to claim 1 is a pipe coupling socket having a piping junction at one end thereof and a plug inlet at the other end, in which a piping passage and the plug inlet are internally connected by means of a through passage of a built-in ball valve, comprising: a socket body having therein a valve chamber, one end of which communicates with the piping passage and the other end of which communicates with the plug inlet, the ball valve located for rotation in the valve chamber, and a valve control sleeve which is fitted on the outer periphery of the socket body and which advances to open the ball valve and retreats to close the ball valve; a locking element which is supported on the distal end portion of the socket body for movement in the centripetal and centrifugal directions and engages an engaging groove formed on the outer periphery of a plug inserted in the plug inlet, thereby locking the plug; a plug connecting sleeve which is fitted on the distal-side outer periphery of the socket body and which advances to move the locking element to the centripetal direction, thereby locking the plug, and retreats to allow the locking element to move to the centrifugal direction, thereby unlocking the plug; first lock means which prevents the valve control sleeve from advancing when the plug connecting sleeve is situated in a retreated position; and second lock means which prevents the retreat of the plug connecting sleeve and the advance of the valve control sleeve when the plug connecting sleeve and the valve control sleeve are situated in an advanced position and a retreated position, respectively, and third lock means which prevents the retreat of the plug connecting sleeve and the valve control sleeve when the plug connecting sleeve and the valve control sleeve are situated in their respective advanced positions.

According to this configuration, the first lock means can prevent the valve control sleeve from advancing when the plug connecting sleeve is situated in the retreated position, the second lock means can prevent the retreat of the plug connecting sleeve and the advance of the valve control sleeve when the plug connecting sleeve and the valve control sleeve are situated in the advanced position and the retreated position, respectively, and the third lock means can prevent the retreat of the plug connecting sleeve and the valve control sleeve when the plug connecting sleeve and the valve control sleeve are situated in their respective advanced positions.

Preferably, the plug connecting sleeve is prevented from rotating in the circumferential direction and allowed to advance when in the retreated position, and is allowed to rotate in the circumferential direction to be prevented from retreating when in the advanced position, the rear end of the plug connecting sleeve having notches formed at given spaces in the circumferential direction, the notches being fitted with first lock balls for movement in the centripetal and centrifugal directions, the first lock balls moving back and forth as the plug connecting sleeve moves back and forth and moving in the circumferential direction with rotation. The outer peripheral surface of the socket body is formed having fitting recesses circumferentially fitted with the first lock balls of the plug connecting sleeve in the advanced position and having a depth for movement to the centripetal direction, the first lock balls being situated on the centripetal direction when the first lock balls are fitted in the fitting recesses, the first lock balls being situated on the centrifugal direction when the plug connecting sleeve is in the retreated position and when the plug connecting sleeve is situated in the advanced position and rotated so that the first lock balls are disengaged from the fitting recesses, the valve control sleeve in the retreated position being prevented from advancing when the plug connecting sleeve is in the retreated position in this state, and the valve control sleeve and the plug connecting sleeve being prevented from retreating when the plug connecting sleeve and the valve control sleeve are in the advanced position. The inner peripheral surface of the valve control sleeve has, on the distal end side thereof, a convex portion which extends in the circumferential direction and has first retaining step portions which engage the first lock, balls when the first lock balls are on the centrifugal side with the plug connecting sleeve in the advanced position, the convex portion is formed having moving grooves in positions corresponding to the fitting recesses in the outer peripheral surface of the socket body, depending on the distance covered by the movement of the plug connecting sleeve, the first lock balls in the centrifugal side being movable in the moving grooves, the moving grooves having, at the bottom thereof, second retaining step portions to which the first lock balls are anchored when the plug connecting sleeve is in the retreated position. Further, the convex portion is formed further having a first lock ball engaging groove which extends in the circumferential direction behind the moving grooves and is engaged by the first lock balls when first lock balls are on the centrifugal side. The first lock balls on the centrifugal side and the second retaining step portions at the bottom of the moving grooves of the valve control sleeve constitute the first lock means, the first lock balls on the centrifugal side and the first retaining step portions of the valve control sleeve constitute the second lock means; the first lock balls on the centrifugal side and the first lock ball engaging groove of the valve control sleeve constitute the third lock means, and the effect of locking by the first, second, and third lock means is removed when the first lock balls are fitted in the fitting recesses in the outer peripheral surface of the socket body and situated on the centripetal side.

According to this configuration, the second lock means, which prevents the retreat of the plug connecting sleeve and the advance of the valve control sleeve when the plug connecting sleeve and the valve control sleeve are situated in the advanced position and the retreated position, respectively, and the third lock means, which prevents the retreat of the plug connecting sleeve and the valve control sleeve when the plug connecting sleeve and the valve control sleeve are situated in their respective advanced positions, can be manipulated by simple operation such that the plug connecting sleeve is rotated in the circumferential direction.

Preferably, the distal end portion of the socket body is fitted with a plurality of second lock balls which are arranged in the circumferential direction behind the locking element for movement in the centripetal and centrifugal directions, the socket body is fitted with a first collar for movement, the first collar in an advanced position supporting and situating the second lock balls on the centrifugal side in a manner such that a part of each second lock ball projects from the outer peripheral surface of the socket body and retreating to release the second lock balls from the support, thereby allowing the second lock balls to sink into the socket body, the first collar being urged in the advancing direction by means of a spring so that the first collar retreats as a plug is inserted therein; the plug connecting sleeve has, on the distal end side of the inner peripheral surface thereof, a plug unlocking recess which extends in the circumferential direction and allows the locking element to move to the centrifugal direction, the plug unlocking recess being followed in the circumferential direction by a taper step portion, which presses and moves the locking element to the centripetal direction, and a plug lock projection, which holds down moved to the centripetal direction, the plug lock projection being followed in the circumferential direction by a second lock ball engaging groove in which the second lock balls are fitted; the plug unlocking recess is situated in the position of the locking element and is allowed to move to the centrifugal direction of the locking element when the second lock balls are on the centrifugal side with the plug connecting sleeve in the retreated position, the second lock balls engaging the second lock ball engaging groove, thereby preventing the advance of the plug connecting sleeve; and the locking element moved to the centrifugal direction in the process of plug insertion engages a step portion at the bottom of the plug unlocking recess of the plug connecting sleeve so that the plug connecting sleeve can advance when the first collar retreats to allow the second lock balls to move to the centripetal direction and be disengaged from the second lock ball engaging groove as the plug is inserted further.

In connecting the plug, according to this configuration, the second lock balls are disengaged from the second lock ball engaging groove after the locking element first engages the taper step portion, the plug connecting sleeve is allowed to advance after the locking element engages the plug. In disconnecting the plug, moreover, the locking element first engages the taper step portion to prevent the advance of the plug connecting sleeve as the plug connecting sleeve is retreated to draw out the plug. Then, the second lock balls engage the second lock ball engaging groove, and thereafter, the locking element is disengaged from the taper step portion. Therefore, there is no possibility of the plug connecting sleeve advancing with the plug not connected owing to partial connection of the plug or the like. Thus, the valve control sleeve cannot advance either, so that the ball valve cannot be opened with the plug not connected.

Preferably, moreover, the respective openings of the piping passage of the piping junction and the plug inlet, which open on the valve chamber side of the socket body, are provided individually with annular rubber seal valve-seats which coaxially face each other across the through passage of the ball valve in an open position and are elastically pressed to the outer peripheral wall of the ball valve, the openings being further provided individually with stoppers which prevent the annular rubber seal valve-seats from being pressed to the ball valve under an internal fluid pressure.

If the annular rubber seal valve-seats, which are elastically pressed to the outer peripheral wall of the ball valve, are subjected to the internal fluid pressure, according to this configuration, the stoppers prevent them from being deformed and from being pressed to the ball valve. Thus, the durability of the annular rubber seal valve-seats and the perfection of sealing can be ensured.

Other objects, features, and advantages of the present invention will be more apparent from the ensuing detailed description taken in connection with the accompanying drawings.

DETAILED DESCRIPTION OF THE INVENTION

Figure 1:
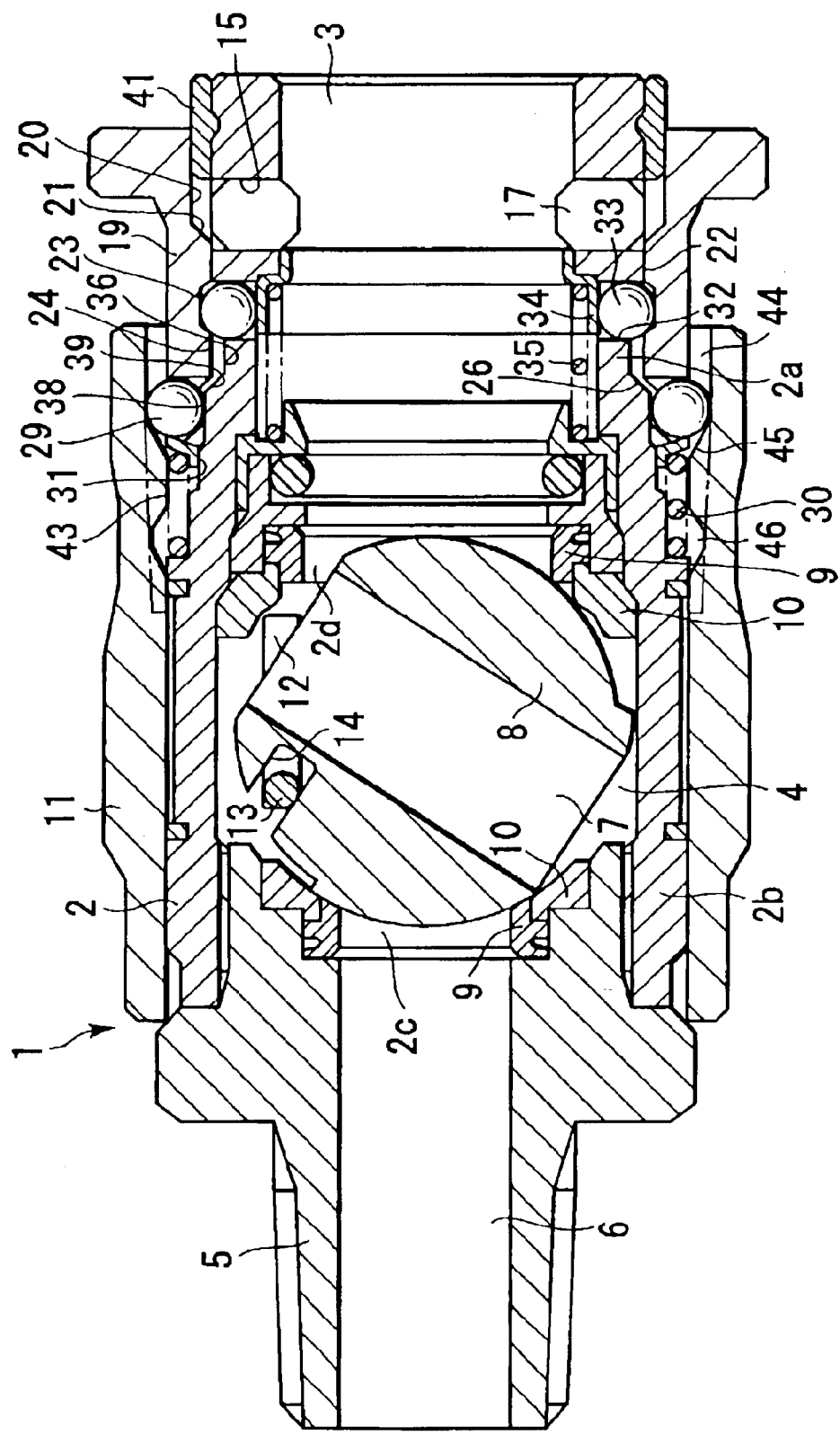
FIG. 1 is a longitudinal sectional view of a first embodiment of a pipe coupling socket according to the present invention, taken across locking elements, first lock balls, and second lock balls.

A first embodiment of a pipe coupling socket according to the present invention will first be described with reference to FIGS. 1 to 11.

A pipe coupling socket 1 of this embodiment comprises a socket body 2, which has a small-outside-diameter cylinder portion 2a on its distal end side and a large-outside-diameter cylinder portion 2b on its rear end side. The socket body 2 is designed so that a plug inlet 3 and a valve chamber 4 are defined in the small-outside-diameter cylinder portion 2a and the large-outside-diameter cylinder portion 2b, respectively. A piping junction 5 is screwed into the rear end portion of the large-outside-diameter cylinder portion 2b. A piping passage 6 of the piping junction 5, the valve chamber 4, and the plug inlet 3 communicate with one another.

A ball valve 8 having a through passage 7 is rotatably supported in the valve chamber 4 by means of a shaft (not shown). The ball valve 8 is rotated to align the through passage 7 with openings 2c and 2d of the piping passage 6 and the plug inlet 3 that open to the valve chamber 4. As this is done, the ball valve 8 is opened, and the respective openings 2c and 2d of the piping passage 6 and the plug inlet 3 are blocked by the outer peripheral wall of the ball valve 8, whereupon the ball valve 8 is closed.

The opening 2c of the piping passage 6 of the piping junction 5 and the opening 2d of the plug inlet 3 that open to the valve chamber 4 are provided individually with seal valve-seats 9 in the form of rubber rings that coaxially face each other with the through passage 7 of the ball valve 8 in its open position between them and are elastically pressed to the outer peripheral wall of the ball valve 8. Further, the openings 2c and 2d are provided individually with ring-shaped stoppers 10 that prevent the annular rubber seal valve-seats 9 from being pressed to the ball valve 8 under an internal fluid pressure.

The operation to rotate the ball valve 8 is carried out by means of a valve control sleeve 11 that is fitted on the outer periphery of the large-outside-diameter cylinder portion 2b of the socket body 2 for movement in the axial direction only. More specifically, the large-outside-diameter cylinder portion 2b of the socket body 2 is provided with two axially elongate slots 12, which are opposed to each other and open into the valve chamber 4. A control rod 13 penetrates the two slots 12 for axial movement in the slots 12. The opposite ends of the control rod 13 are fixed to the valve control sleeve 11. As the valve control sleeve 11 moves forward or backward, the control rod 13 moves in the same direction in the slots 12.

The ball valve 8 is formed having an engaging groove 14 in which the control rod 13 is fitted. As the control rod 13 moves with the forward or backward movement of the valve control sleeve 11, the ball valve 8 rotates to be opened or closed.

Further, circumferential elongate slots 15 are formed in the distal end portion of the small-outside-diameter cylinder portion 2a of the socket body 2. Locking elements 17 that engage an engaging groove 18 in the outer periphery of a plug 16, thereby locking the plug 16, are loosely fitted in the slots 15. The slots 15 (two in number in this embodiment) are arranged at equal spaces in the circumferential direction of the small-outside-diameter cylinder portion 2a. Retaining step portions 15a are formed individually on the longitudinally opposite sides of each slot 15. The retaining step portions 15a individually engage the locking elements 17 so that a part of each locking element 17 can be kept projecting in the inner surface of the small-outside-diameter cylinder portion 2a. The dimension of each locking element 17 in its centripetal and centrifugal directions is a little greater than the wall thickness of the small-outside-diameter cylinder portion 2a.

The locking elements 17 move to the centrifugal direction when they are pressed by a taper surface 16a that is formed on the outer peripheral surface of the plug 16 on its distal end side. When the engaging groove 18 on the outer periphery of the plug 16 is aligned with the locking elements 17, the locking elements 17 move to the centripetal direction so that they can be fitted in the engaging groove 18.

A plug connecting sleeve 19 is fitted on the outer periphery of the small-outside-diameter cylinder portion 2a of the socket body 2 so as to be movable back and forth in the axial direction and rotatable in the circumferential direction. As the sleeve 19 advances, it presses and moves the locking elements 17 to the centripetal direction, thereby locking the socket body 2 and the plug 16. As the sleeve 19 retreats, it releases the locking elements 17 from the press so that the locking elements 17 can move to the centrifugal direction, thereby unlocking the socket body 2 and the plug 16.

A plug unlocking recess 20 is formed extending in the circumferential direction on the distal end side of the inner peripheral surface of the plug connecting sleeve 19. It allows the locking elements 17 to move to the centrifugal direction. Behind the plug unlocking recess 20, a taper step portion 21 and a plug lock projection 22 are arranged in the circumferential direction. The taper step portion 21 moves to the centrifugal direction and engages the locking elements 17 that partially project from the outer periphery of the small-outside-diameter cylinder portion 2a, thereby pressing and moving the locking elements 17 to the centripetal direction. The plug lock projection 22 holds down the locking elements 17 that are moved to the centripetal direction.

In the inner peripheral surface of the plug connecting sleeve 19, moreover, a second lock ball engaging groove 23 is formed extending in the circumferential direction behind the plug lock projection 22. A second lock ball (mentioned later) in the small-outside-diameter cylinder portion 2a of the socket body 2 is fitted in the groove 23. Further, projections 24 that are arranged in the circumferential direction behind the second lock ball engaging groove 23 are formed having engaging grooves 25 in positions corresponding to engaging projections (mentioned later) on the outer periphery of the small-outside-diameter cylinder portion 2a. The engaging projections can be fitted in the engaging grooves 25 for axial movement. Furthermore, the inner peripheral surface of the plug connecting sleeve 19 on its rear end side is formed having a recess 27 that is flush with the respective groove bases of the engaging grooves 25. A plurality of notches 28 (two in number in this embodiment) are arranged at given spaces in the circumferential direction at the rear end of the plug connecting sleeve 19 in which the recess 27 is formed. First lock balls 29 that have a diameter greater than the wall thickness of the plug connecting sleeve 19 are fitted individually in the notches 28 for movement in the centripetal and centrifugal directions. The first lock balls 29 are urged to get into the notches 28 via a second collar 31 by means of a spring 30 that is interposed between the rear end of the plug connecting sleeve 19 and the socket body 2. Thus, the first lock balls 29 are prevented from slipping out of the respective openings of the notches 28 to the rear end side of the plug connecting sleeve 19. The plug connecting sleeve 19 is urged to advance by means of the spring 30 with the aid of the first lock balls 29.

The small-outside-diameter cylinder portion 2a of the socket body 2 on which the plug connecting sleeve 19 is fitted is formed having fitting holes 32, which are arranged in the circumferential direction and situated behind the slots 15 in which the locking elements 17 are fitted. Second lock balls 33 are fitted individually in the fitting holes 32 for movement in the centripetal and centrifugal directions. The fitting holes 32 (four in number in this embodiment) are arranged at equal spaces in the circumferential direction of the small-outside-diameter cylinder portion 2a. On the inner peripheral side of the small-outside-diameter cylinder portion 2a, each fitting hole 32 is tapered toward the inner periphery of the small-outside-diameter cylinder portion 2a so that a part of each second lock ball 33 can be kept projecting from the inner surface. The diameter of each second lock ball 33 is a little greater than the wall thickness of the small-outside-diameter cylinder portion 2a.

The positions of the fitting holes 32 in which the second lock balls 33 are fitted are set so that they are aligned with the position of the second lock ball engaging groove 23 in the inner peripheral surface of the plug connecting sleeve 19 when the plug connecting sleeve 19 is in its retreated position. When the second lock balls 33 that are fitted individually in the fitting holes 32 are on the centrifugal side in this state, a part of each second lock ball 33 that projects from the outer periphery of the small-outside-diameter cylinder portion 2a engages the second lock ball engaging groove 23.

Further, a first collar 34 is movably fitted in the small-outside-diameter cylinder portion 2a. It advances to support and situate the second lock balls 33 on the centrifugal side or retreats to release the second lock balls 33 from the support, thereby allowing the second lock balls 33 to move to the centripetal direction. This first collar 34 is advanced by means of a spring 35 or retreated as the plug 16 is inserted therein.

Furthermore, fitting recesses 36 are formed corresponding to the first lock balls 29 on the outer peripheral surface of the small-outside-diameter cylinder portion 2a and arranged in the circumferential direction. They are deep enough to allow the first lock balls 29 in engagement with the notches 28 in the rear end of the plug connecting sleeve 19 in its advanced position to be fitted therein and move to the centripetal direction. When the plug connecting sleeve 19 advances so that the first lock balls 29 are fitted individually in the fitting recesses 36, the first lock balls 29 move to the centripetal direction and sink into the plug connecting sleeve 19. If the plug connecting sleeve 19 is rotated in the circumferential direction in this state, the first lock balls 29 get out of the fitting recesses 36, run on to the outer peripheral surface of the small-outside-diameter cylinder portion 2a, and move to the centrifugal direction. Thus, a part of each first lock ball 29 projects from the outer periphery of the plug connecting sleeve 19.

Further, retaining recesses 37 that are engaged by the first lock balls 29 are formed on the outer periphery of the small-outside-diameter cylinder portion 2a so as to be arranged in the same circumferential direction with the fitting recesses 36. The retaining recesses 37 have a depth such that the first lock balls 29 that are fitted therein still partially project from the outer periphery of the plug connecting sleeve 19.

The distal end of the small-outside-diameter cylinder portion 2a is provided with a ring-shaped stopper 41, which prevents the plug connecting sleeve 19 from slipping away and regulates its advanced position.

Further, engaging recesses 38 are formed behind the fitting recesses 36. The first lock balls 29 individually engage them when the plug connecting sleeve 19 is situated in its retreated position. Each engaging recess 38 and its corresponding fitting recess 36 axially range with each other with a taper step portion 39 between them.

Furthermore, engaging step portions 40 are formed individually adjacent to the fitting recesses 36 and the retaining recesses 37 on the outer periphery of the small-outside-diameter cylinder portion 2a. When the plug connecting sleeve 19 is in the retreated position, the step portions 40 engage the engaging grooves 25 in the projections 24, thereby preventing the plug connecting sleeve 19 from rotating in the circumferential direction and allowing it to move in the axial direction only. When the plug connecting sleeve 19 is in the advanced position, the step portions 40 are disengaged from the engaging grooves 25 and engage step portions 26 behind the projections 24, thereby preventing the plug connecting sleeve 19 from retreating and allowing it to rotate in the circumferential direction.

The valve control sleeve 11 has a convex portion 43 that is located on its distal end side and extends in the circumferential direction. The convex portion 43 has tapered first engaging step portions 42, which engage the first lock balls 29 when the first lock balls 29 are disengaged from the fitting recesses 36 and situated on the centrifugal side with the plug connecting sleeve 19 in the advanced position.

The convex portion 43 is formed having slots 44 that are situated corresponding to the fitting recesses 36 and engaging recesses 38 in the outer peripheral surface of small-outside-diameter cylinder portion 2a. The first lock balls 29 can move in the slots 44. The slots 44 are formed according to the extent of advance and retreat of the plug connecting sleeve 19.

Each slot 44 has a second retaining step portion 45 at the bottom of it. Each corresponding first lock ball 29 engages the second retaining step portion 45 when the plug connecting sleeve 19 is in the retreated position.

Further, the convex portion 43 is formed having a first lock ball engaging groove 46 behind the slots 44. The first lock balls 29 engage the groove 46 when the first lock balls 29 are disengaged from the fitting recesses 36 and situated on the centrifugal side with the plug connecting sleeve 19 in the advanced position.

The first lock balls 29 on the centrifugal side and the second retaining step portions 45 at the bottom of the slots 44 of the valve control sleeve 11 constitute first lock means that prevents the advance of the valve control sleeve 11 when the plug connecting sleeve 19 is in the retreated position. The first lock balls 29 on the centrifugal side and the first retaining step portions 42 of the valve control sleeve 11 constitute second lock means that prevents the retreat of the plug connecting sleeve 19 and the advance of the valve control sleeve 11 when the plug connecting sleeve 19 and the valve control sleeve 11 are in their advanced and retreated positions, respectively. The first lock balls 29 on the centrifugal side and the first lock ball engaging groove 46 of the valve control sleeve 11 constitute third lock means that prevents the retreat of the plug connecting sleeve 19 and the valve control sleeve 11 when the plug connecting sleeve 19 and the valve control sleeve 11 are in their respective advanced positions.

Further, grooves 46a are formed extending to the distal end portion and communicating with the first lock ball engaging groove 46. They allow the fluid pressure on the side of the plug 16 to be discharged into the atmosphere when the ball valve 8 is closed.

Furthermore, the effect of locking by the first, second, and third lock means is removed when the first lock balls 29 are fitted in the fitting recesses 36 in the outer peripheral surface of the small-outside-diameter cylinder portion 2a and situated on the centripetal side.

The following is a description of operation for connecting the pipe coupling socket 1 and the plug 16.

In the pipe coupling socket 1 that is not connected with the plug 16, the second lock balls 33, which are supported by means of the advanced first collar 34, are situated on the centrifugal side, and engage the second lock ball engaging groove 23 of the plug connecting sleeve 19 in the retreated position. Thereupon, the plug connecting sleeve 19 is prevented from advancing. The second lock balls 29, which are in engagement with the notches 28 at the rear end of the plug connecting sleeve 19, engage the engaging recesses 38 in the outer peripheral surface of the small-outside-diameter cylinder portion 2a and partially project from the outer periphery of the plug connecting sleeve 19. The first lock balls 29 are situated in the slots 44 of the valve control sleeve 11 in the retreated position. Those parts of them which project from the outer periphery of the plug connecting sleeve 19 engage the second retaining step portions 45 at the bottom of the slots 44. Thus, the valve control sleeve 11 is prevented from advancing, and the ball valve 8 is in its closed state.

The engaging projections 40 that are formed on the outer periphery of the small-outside-diameter cylinder portion 2a engages the engaging grooves 25 in the inner periphery of the plug connecting sleeve 19, thereby preventing the plug connecting sleeve 19 from rotating (FIG. 1).

Figure 2:
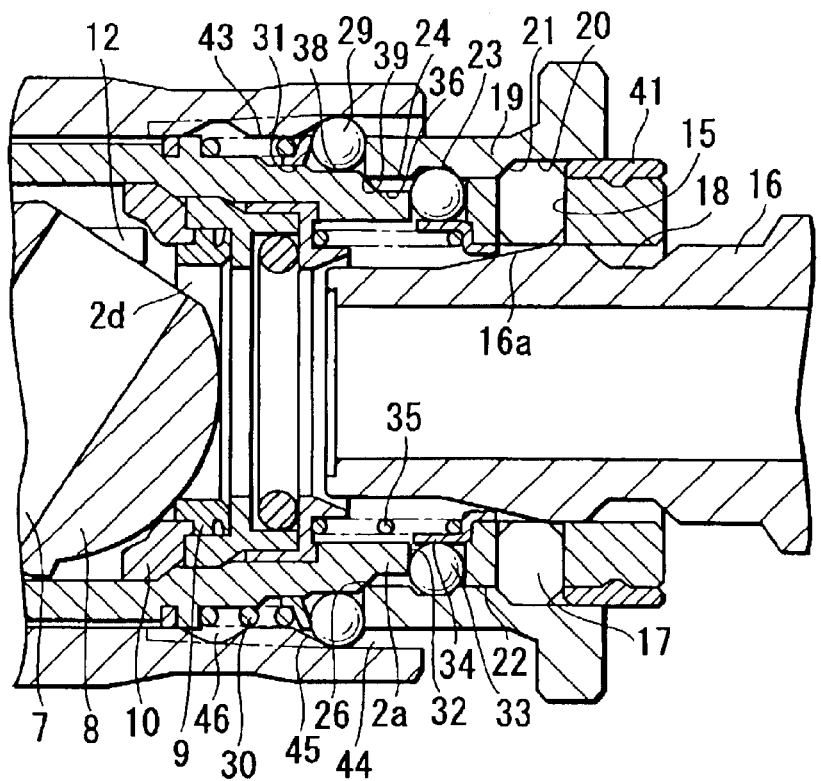
FIG. 2 is a longitudinal sectional view of a principal part showing a process of connecting a plug to the pipe coupling socket shown in FIG. 1.

If the plug 16 is inserted into the plug inlet 3 in this state, the locking elements 17 that are fitted individually in the slots 15 of the small-outside-diameter cylinder portion 2a are first pressed in the centrifugal direction by the taper surface 16a that is formed on the outer peripheral surface of the plug 16, and move to the centrifugal direction. The locking elements 17 partially enter the plug unlocking recess 20 of the plug connecting sleeve 19 and engage the taper step portion 21 (FIG. 2).

Figure 3:
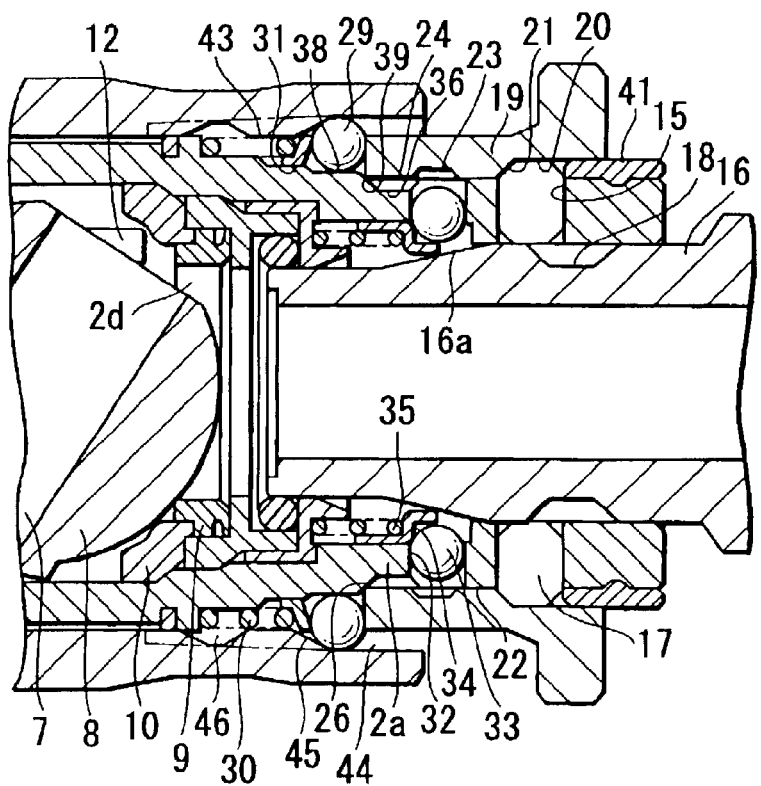
FIG. 3 is a longitudinal sectional view of the principal part showing a process of connecting the plug to the pipe coupling socket shown in FIG. 1.

If the plug 16 is further inserted, the first collar 34 is pressed by the taper surface 16a of the plug 16 and retreats, thereby releasing the second lock balls 33 on the centrifugal side from the support. Thereupon, the second lock balls 33 are disengaged from the second lock ball engaging groove 23 of the plug connecting sleeve 19. At this point in time, the locking elements 17 are in engagement with the taper step portion 21, so that the plug connecting sleeve 19 is prevented from advancing (FIG. 3).

If the plug 16 is further inserted so that the engaging groove 18 on the outer periphery of the plug 16 reaches the position of the locking elements 17, the locking elements 17 move to the centripetal direction and engage the engaging groove 18. Thereupon, the plug connecting sleeve 19, released from the engagement with the locking elements 17, is urged by the spring 30 to advance. The locking elements 17 that are in engagement with the engaging groove 18 are pressed by the plug lock projection 22 on the inner peripheral surface of the sleeve 19 and prevented from moving to the centrifugal direction. Thus, the pipe coupling socket 1 and the plug 16 are connected to each other.

In disconnecting the pipe coupling socket 1 and the plug 16 connected in this manner, the plug connecting sleeve 19 in the aforesaid state is retreated so that the locking elements 17 are situated on the side of the plug unlocking recess 20 and released from the press by the plug lock projection 22. In this state, the plug 16 is drawn out. As the plug 16 is drawn out in this manner, the locking elements 17 that are disengaged from the engaging groove 18 first move pressed to the centrifugal direction by the outer periphery of the plug 16, get into the plug unlocking recess 20 of the retreated plug connecting sleeve 19, and engage the taper step portion 21 (FIG. 3).

If the plug 16 is further drawn out, the first collar 34, having so far been retreated as the plug 16 is drawn out, is urged by the spring 35 to advance, thereby moving the second lock balls 33 on the centripetal side to the centrifugal direction. The second lock balls 33 moved to the centrifugal direction engage the second lock ball engaging groove 23 of the plug connecting sleeve 19 (FIG. 2).

If the plug 16 is further drawn out and disconnected from the pipe coupling socket 1, the locking elements 17 are disengaged from the taper step portion 21, and the plug connecting sleeve 19 is held in the retreated position and prevented from advancing by the second lock balls 33.

Thus, in connecting the plug 16, the second lock balls 33 are disengaged from the second lock ball engaging groove 23 after the locking elements 17 first engage the taper step portion 21. The plug connecting sleeve 19 can be advanced after the locking elements 17 engage the engaging groove 18 of the plug 16. In disconnecting the plug 16, on the other hand, the plug connecting sleeve 19 is retreated to draw out the plug 16. In this process, the locking elements 17 are first anchored to the taper step portion 21, thereby preventing the advance of the plug connecting sleeve 19, the second lock balls 33 then engage the second lock ball engaging groove 23, and the locking elements 17 are disengaged from the taper step portion 21 thereafter. Accordingly, there is no possibility of the plug connecting sleeve 19 advancing without the connection of the plug 16 owing to deficient connection of the plug 16 or the like. Without the connection of the plug 16, therefore, the valve control sleeve 11 cannot advance either, and the ball valve 8 cannot be opened.

Figure 4:
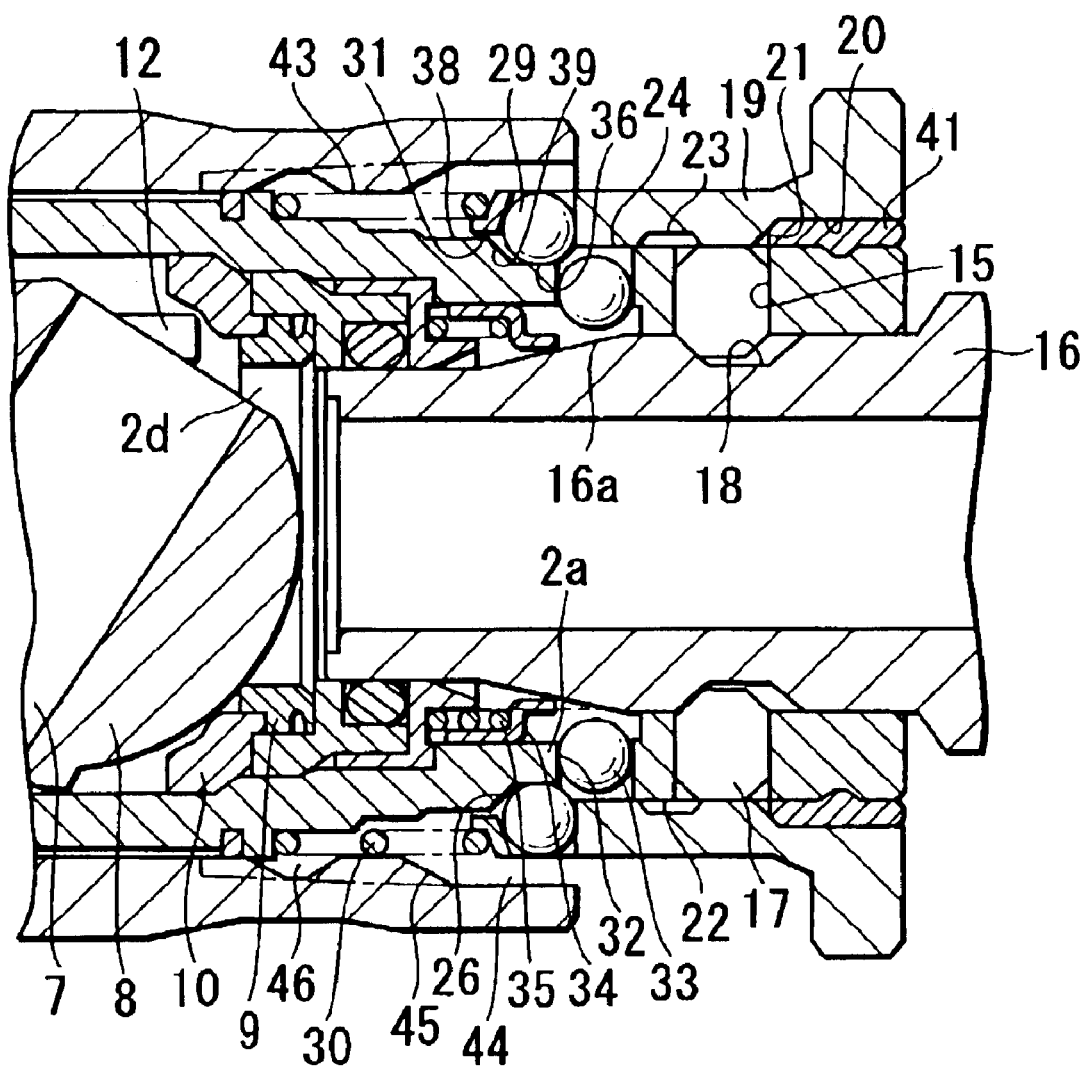
FIG. 4 is a longitudinal sectional view of the principal part showing a process of connecting the plug to the pipe coupling socket shown in FIG. 1.

If the plug connecting sleeve 19 advances in the aforesaid manner, the first lock balls 29 that are in engagement with the notches 28 at the rear end of the plug connecting sleeve 19 are urged by the spring 30 to advance together with the plug connecting sleeve 19. Then, they are fitted individually into fitting recesses 36 in the outer peripheral surface of the small-outside-diameter cylinder portion 2a, and move to the centripetal direction. As this is done, the engaging projections 40 of the small-outside-diameter cylinder portion 2a are disengaged from the engaging grooves 25, whereupon the plug connecting sleeve 19 is allowed to rotate in the circumferential direction (FIG. 4).

Figure 5:
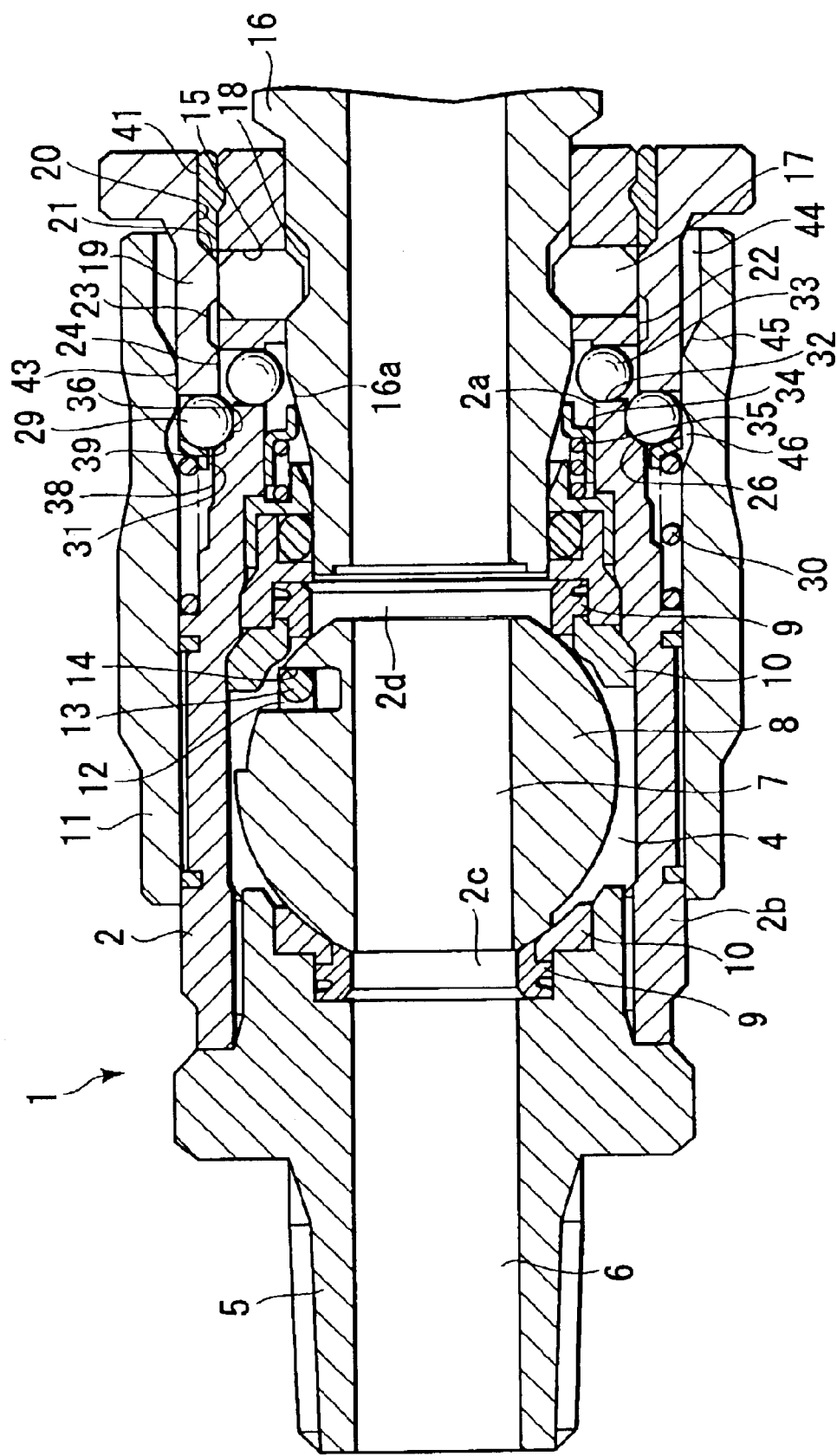
FIG. 5 is a longitudinal sectional view of a principal part showing a state in which a ball valve is opened after the plug is connected to the pipe coupling socket shown in FIG. 1.

If the valve control sleeve 11 is advanced in this states the convex portion 43 on the inner peripheral surface of the valve control sleeve 11 passes over the first lock balls 29, since the first lock balls 29 are fitted in the fitting recesses 36 and situated on the centripetal side. Thus, the valve control sleeve 11 reaches the advanced position, whereupon the ball valve 8 opens. At this point of time, the first lock balls 29 are situated corresponding to the first lock ball engaging groove 46 that is formed in the inner peripheral surface of the valve control sleeve 11 (FIG. 5).

If the plug connecting sleeve 19 in this state is rotated in the circumferential direction, the first lock balls 29 rotate in the same direction, get out of the fitting recesses 36, and run on to the outer peripheral surface of the small-outside-diameter cylinder portion 2a. Thus, they move to the centrifugal direction and engage the first lock ball engaging groove 46 of the valve control sleeve 11. Further, the engaging projections 40 that are disengaged from the engaging grooves 25 as the plug connecting sleeve 19 advances engage the step portions 26 behind the projections 24.

Figure 6:
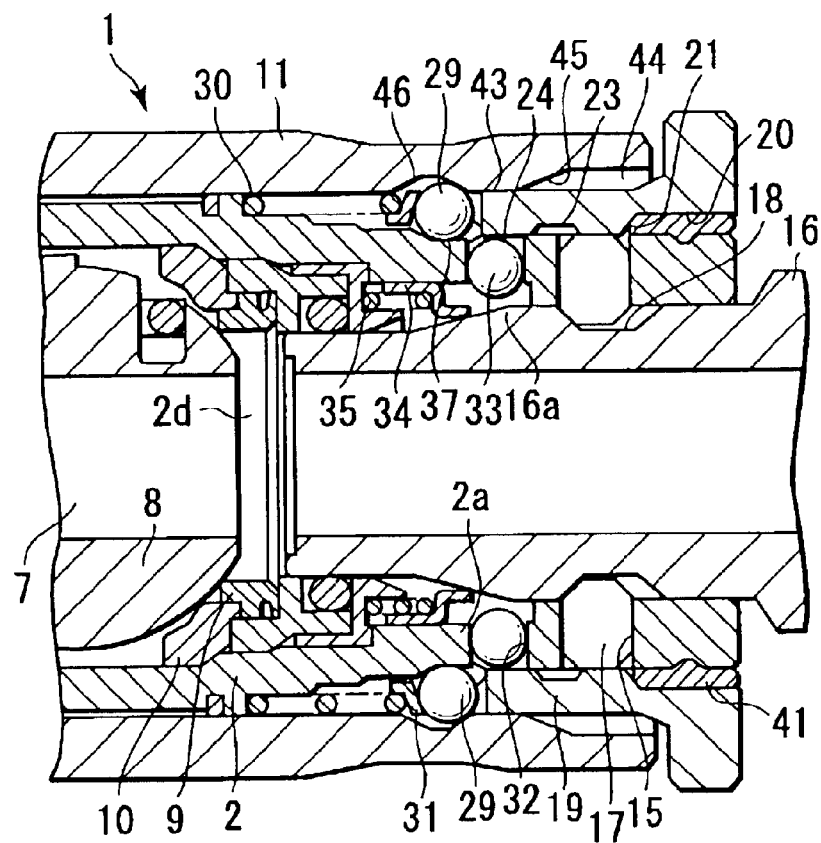
FIG. 6 is a longitudinal sectional view of the principal part showing a state in which a valve control sleeve and a plug connecting sleeve are locked with the plug connected to the pipe coupling socket shown in FIG. 1 and with the ball valve open.

Thus, the plug connecting sleeve 19 is prevented from retreating by the engaging projections 40 that engage the step portions 26 behind the projections 24. The valve control sleeve 11 is locked together with the plug connecting sleeve 19 and prevented from retreating by the first lock balls 29 that engage the first lock ball engaging groove 46. The plug connecting sleeve 19 in the locked state can be held lest it be easily rotatable by causing the first lock balls 29 to engage the shallow retaining recesses 37 (FIG. 6).

In closing the ball valve 8 in this state, the plug connecting sleeve 19 is rotated to cause the first lock balls 29 to be fitted in the fitting recesses 36. Thereupon, the aforesaid locked state is canceled, and the ball valve 8 can be closed by retreating the valve control sleeve 11 (state of FIG. 4).

If the plug connecting sleeve 19 in this state is rotated in the circumferential direction, the first lock balls 29 rotate in the same direction and leave the fitting recesses 36. Then, they move to the centrifugal direction and engage the shallow retaining recesses 37 and the first retaining step portions 42 of the valve control sleeve 11.

Figure 7:
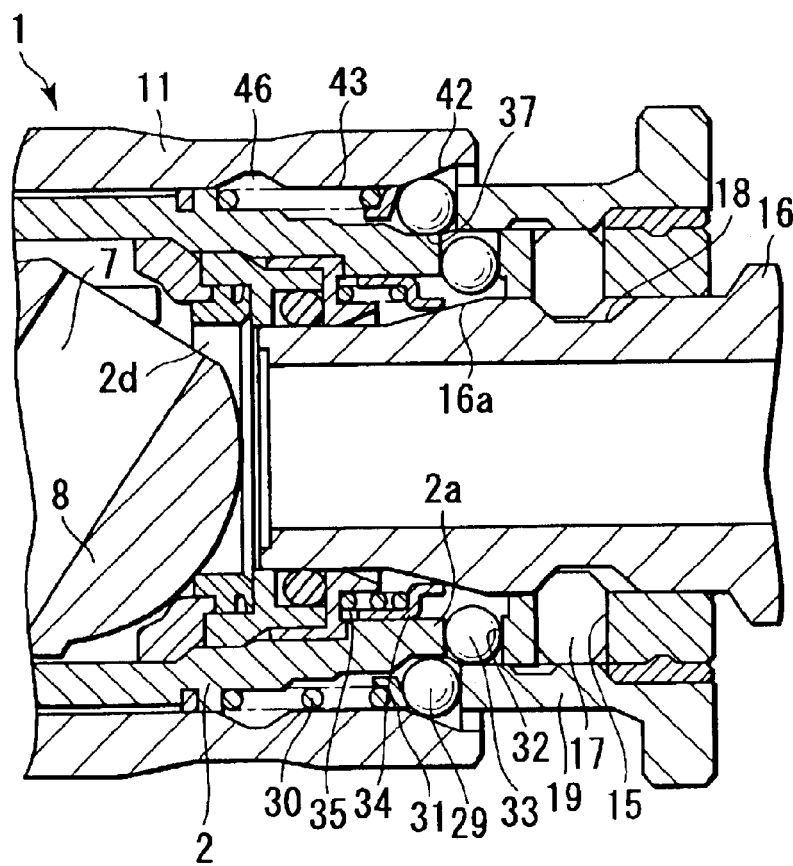
FIG. 7 is a longitudinal sectional view of the principal part showing a state in which the valve control sleeve and the plug connecting sleeve are locked with the plug connected to the pipe coupling socket shown in FIG. 1 and with the ball valve closed.
Figure 8:
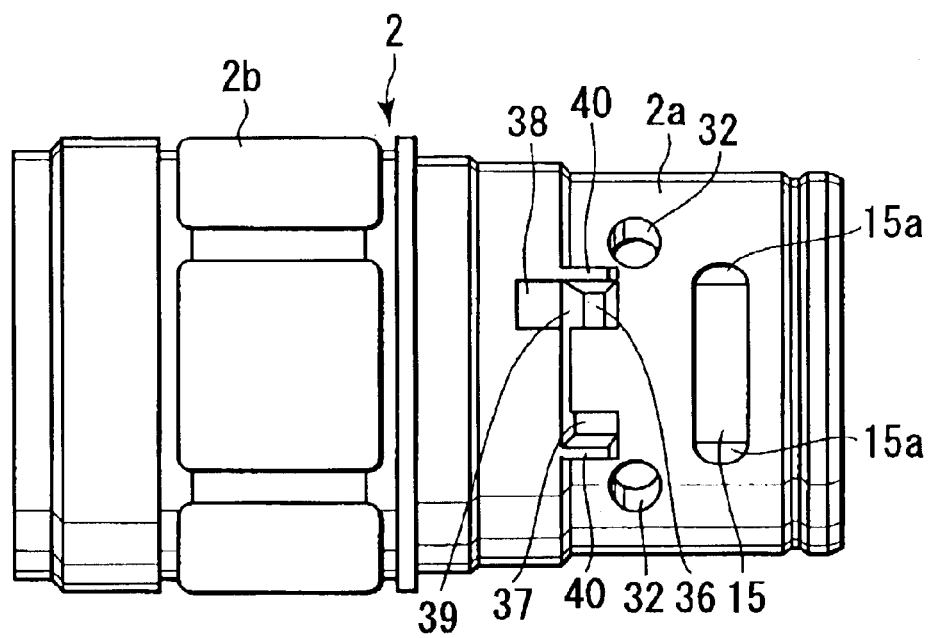
FIG. 8 is a plan view showing a socket body of the pipe coupling socket shown in FIG. 1.
Figure 9:
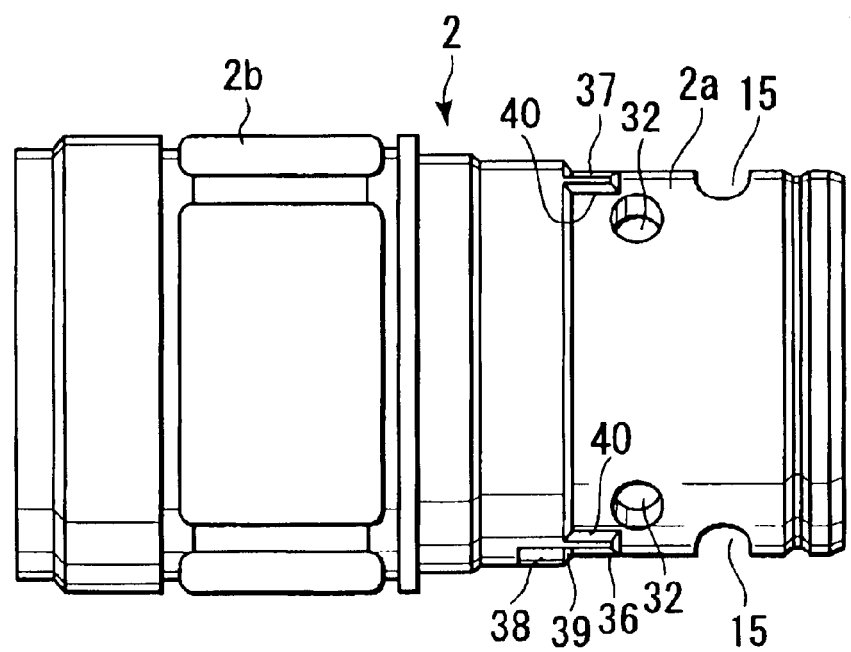
FIG. 9 is a side view showing the socket body of the pipe coupling socket shown in FIG. 1.
Figure 10:
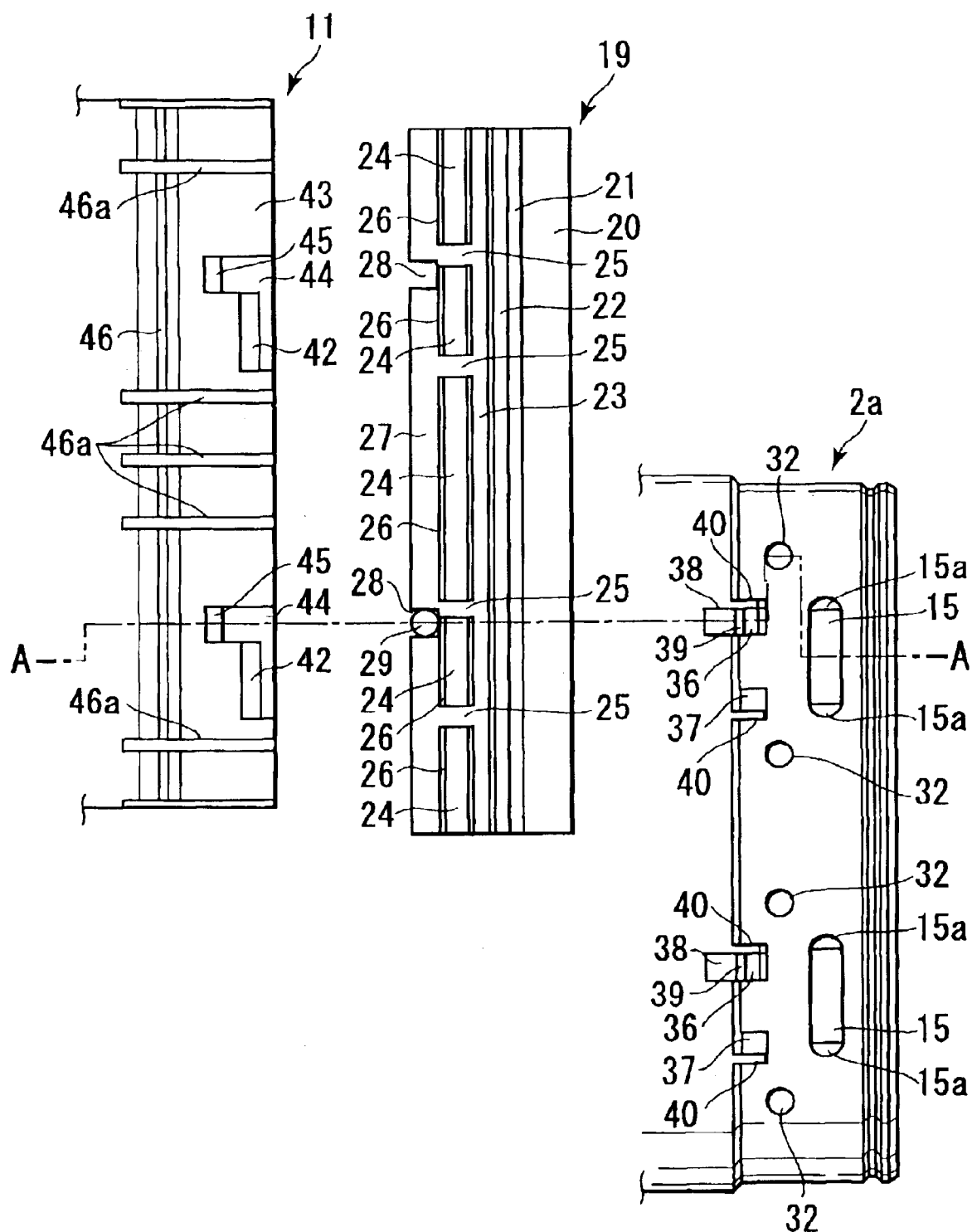
FIG. 10 is a development illustrating the socket body, valve control sleeve, and plug connecting sleeve, based on line A—A representing the positional relations between the pipe coupling socket shown in FIG. 1, cut positions of FIGS. 1 to 5, showing the process in which the plug is inserted into the pipe coupling socket to open the ball valve, locking elements, first lock balls, and second lock balls.
Figure 11:
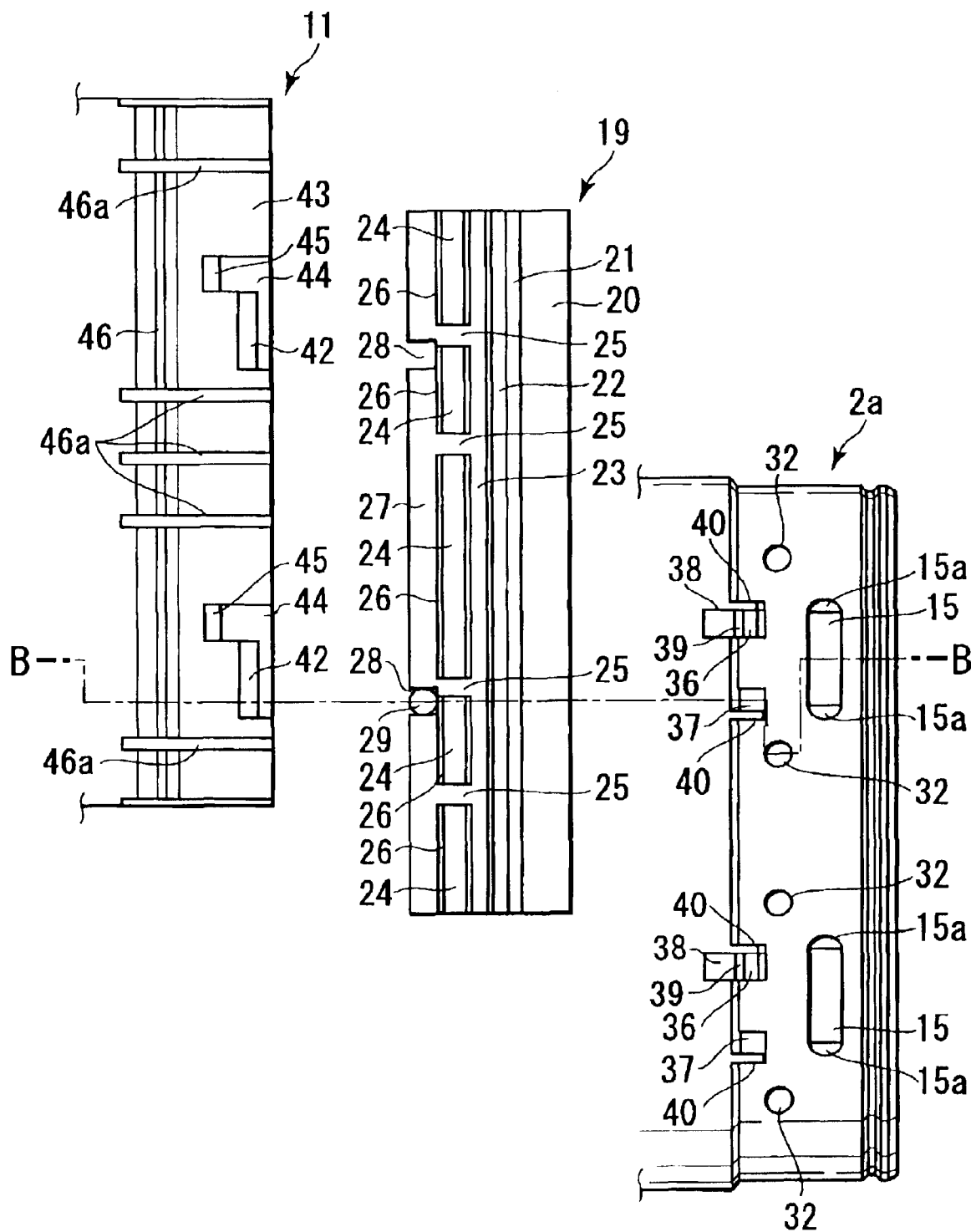
FIG. 11 is a development illustrating the socket body, valve control sleeve, and plug connecting sleeve, based on line B—B representing the positional relations between the cut positions of FIGS. 6 and 7, showing the state in which the valve control sleeve and the plug connecting sleeve of the pipe coupling socket shown in FIG. 1 are locked, locking-elements, first lock balls, and second lock balls.
Figure 12:
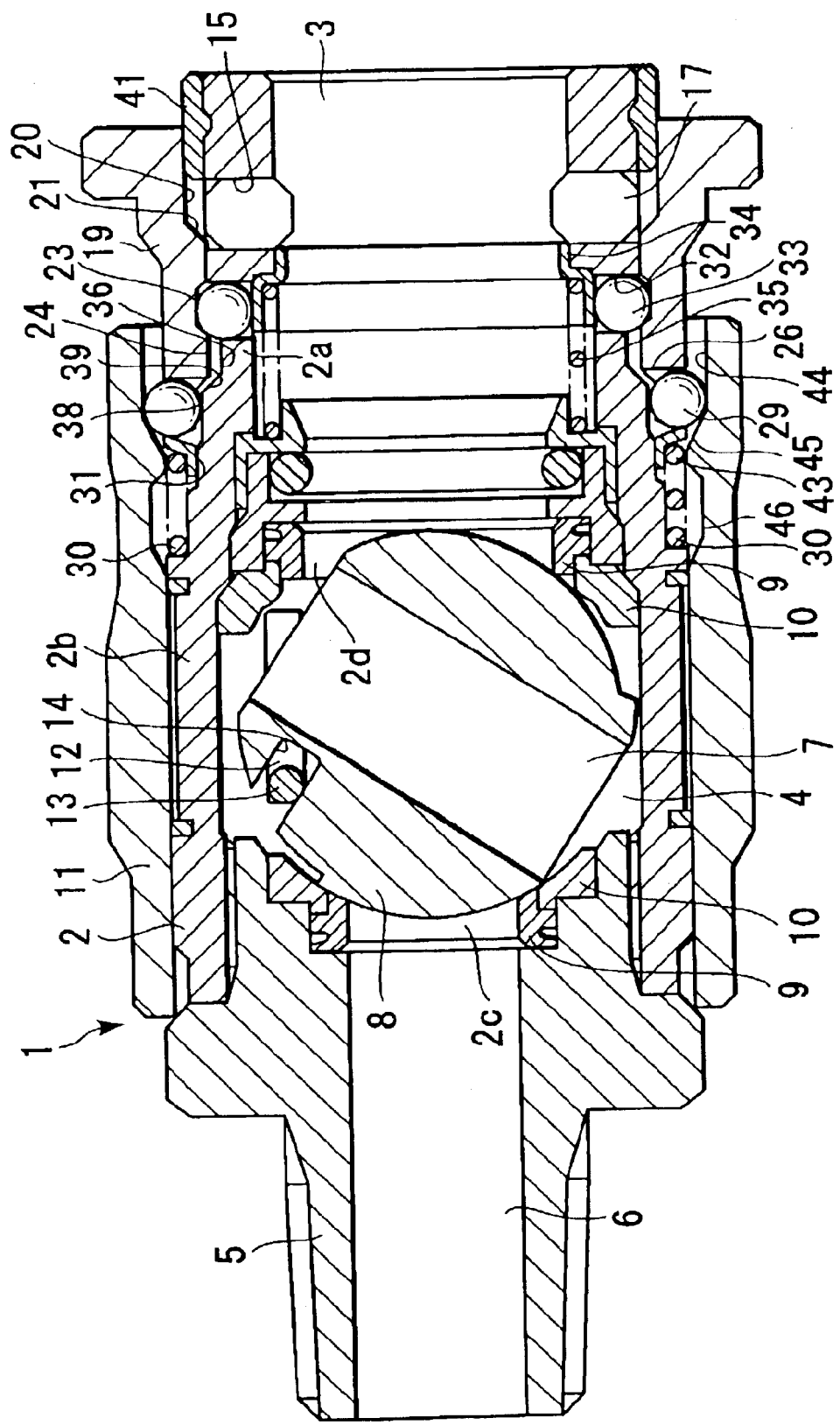
FIG. 12 is a longitudinal sectional view of a second embodiment of the pipe coupling socket according to the present invention, taken across locking elements, first lock balls, and second lock balls.
Figure 13:
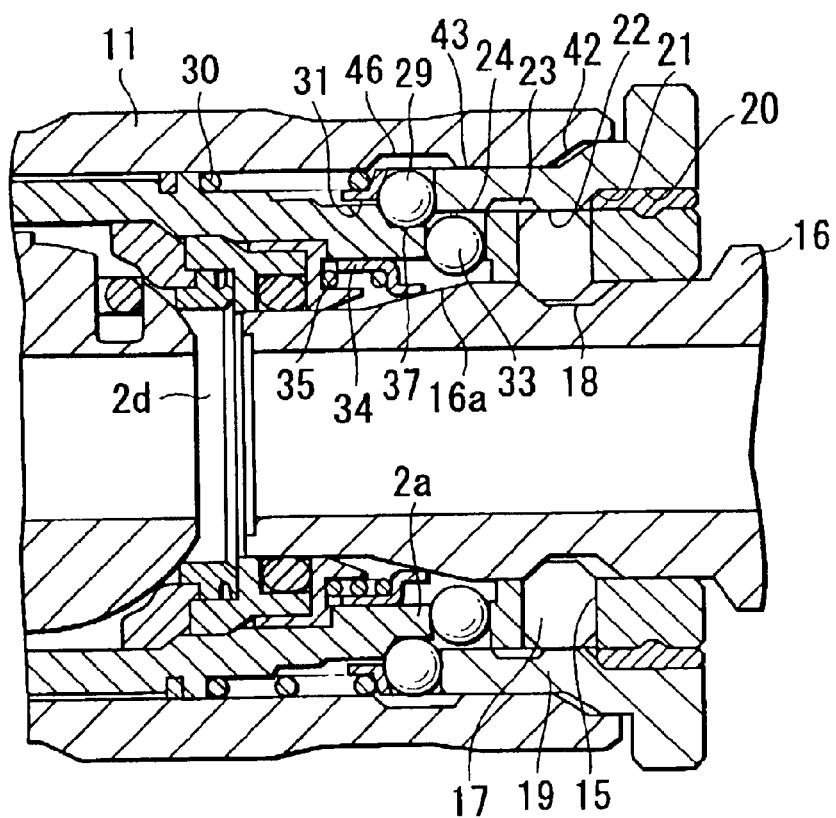
FIG. 13 is a longitudinal sectional view of a principal part showing a state in which a valve control sleeve and a plug connecting sleeve are locked with the plug connected to the pipe coupling socket shown in FIG. 12 and with a ball valve open.
Figure 14:
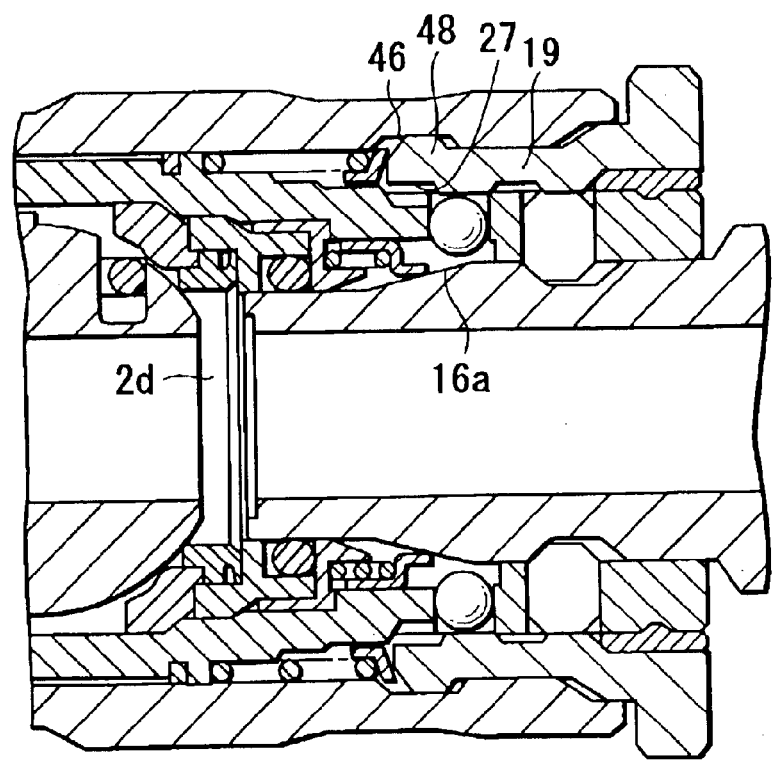
FIG. 14 is a longitudinal sectional view of the principal part in the same state of FIG. 13, taken in a position off first lock balls.
Figure 15:
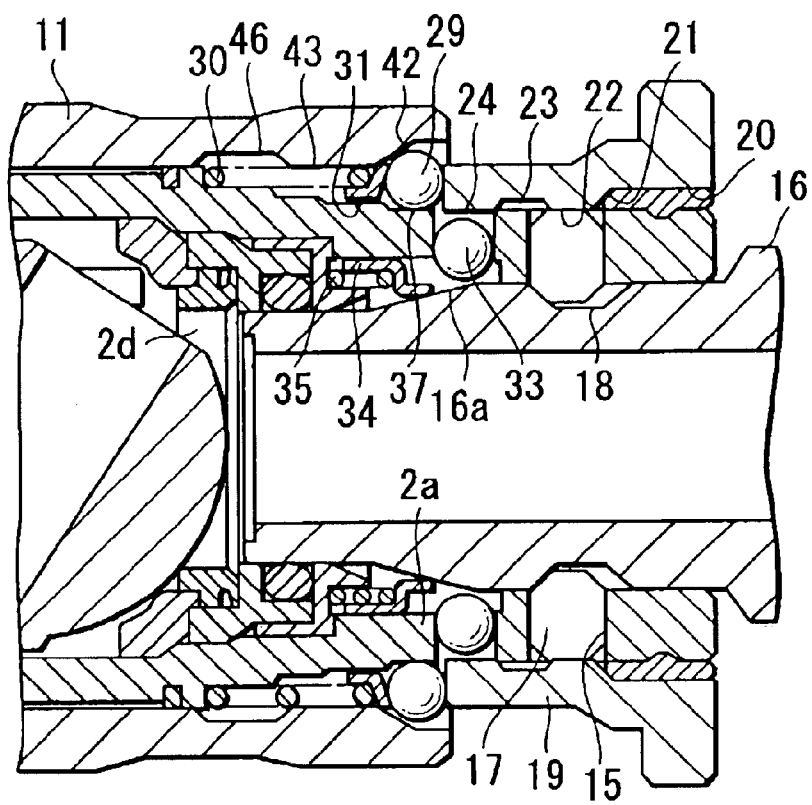
FIG. 15 is a longitudinal sectional view of the principal part showing a state in which the valve control sleeve and the plug connecting sleeve are locked with the plug connected to the pipe coupling socket shown in FIG. 12 and with the ball valve closed.
Figure 16:
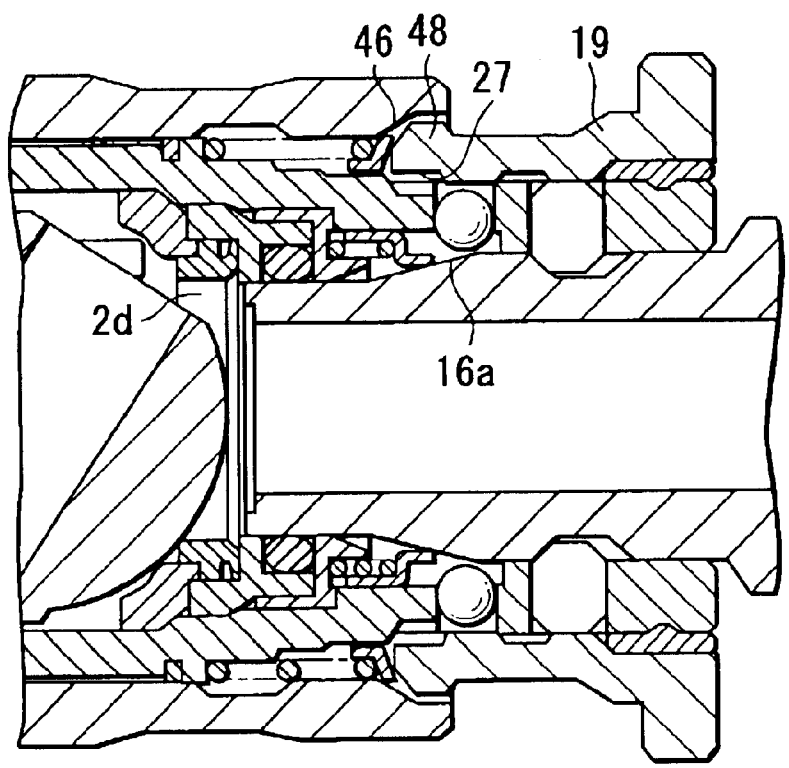
FIG. 16 is a longitudinal sectional view of the principal part in the same state of FIG. 15, taken in a position off the first lock balls.
Figure 17:
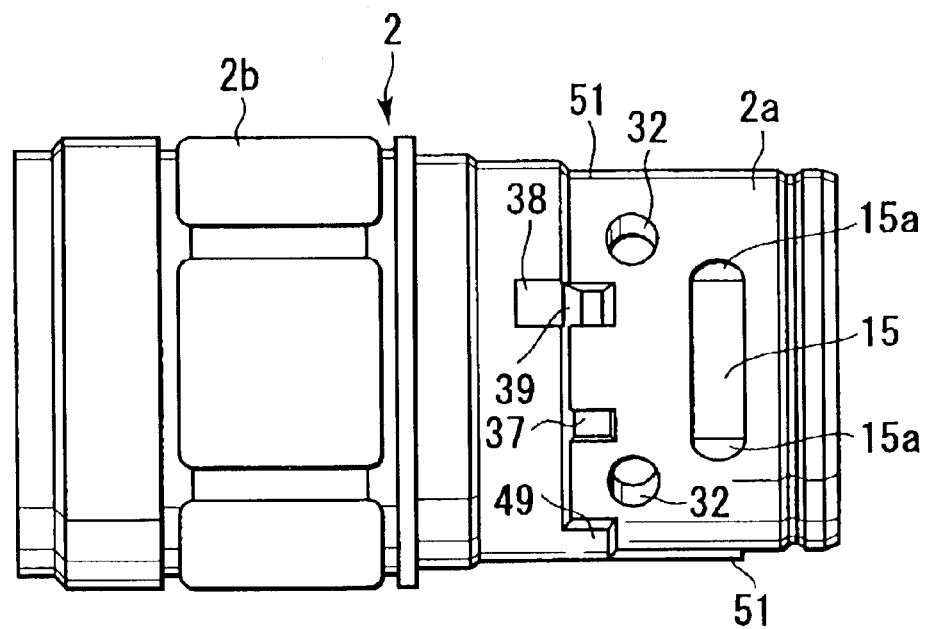
FIG. 17 is a plan view showing a socket body of the pipe coupling socket shown in FIG. 12.
Figure 18:
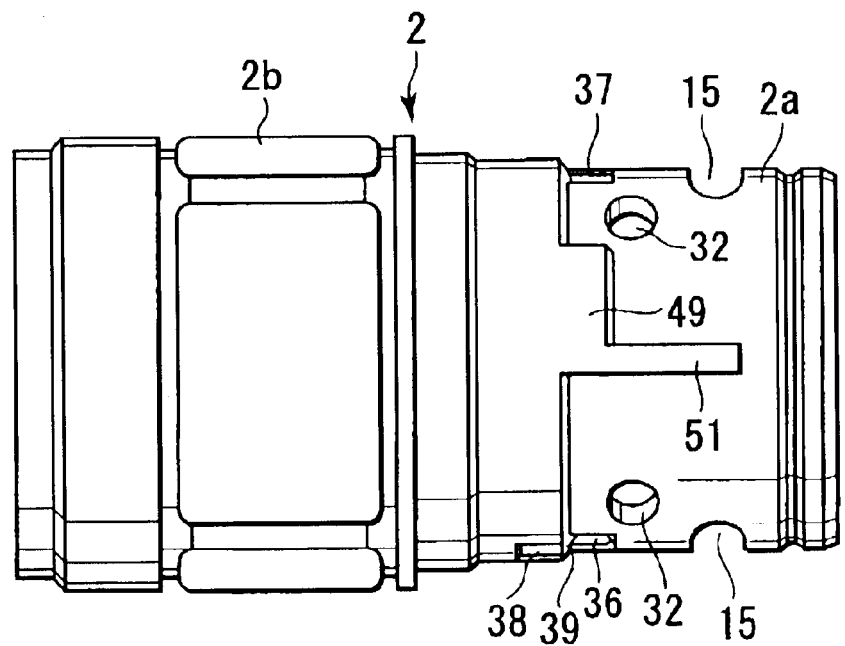
FIG. 18 is a side view showing the socket body of the pipe coupling socket shown in FIG. 12.
Figure 19:
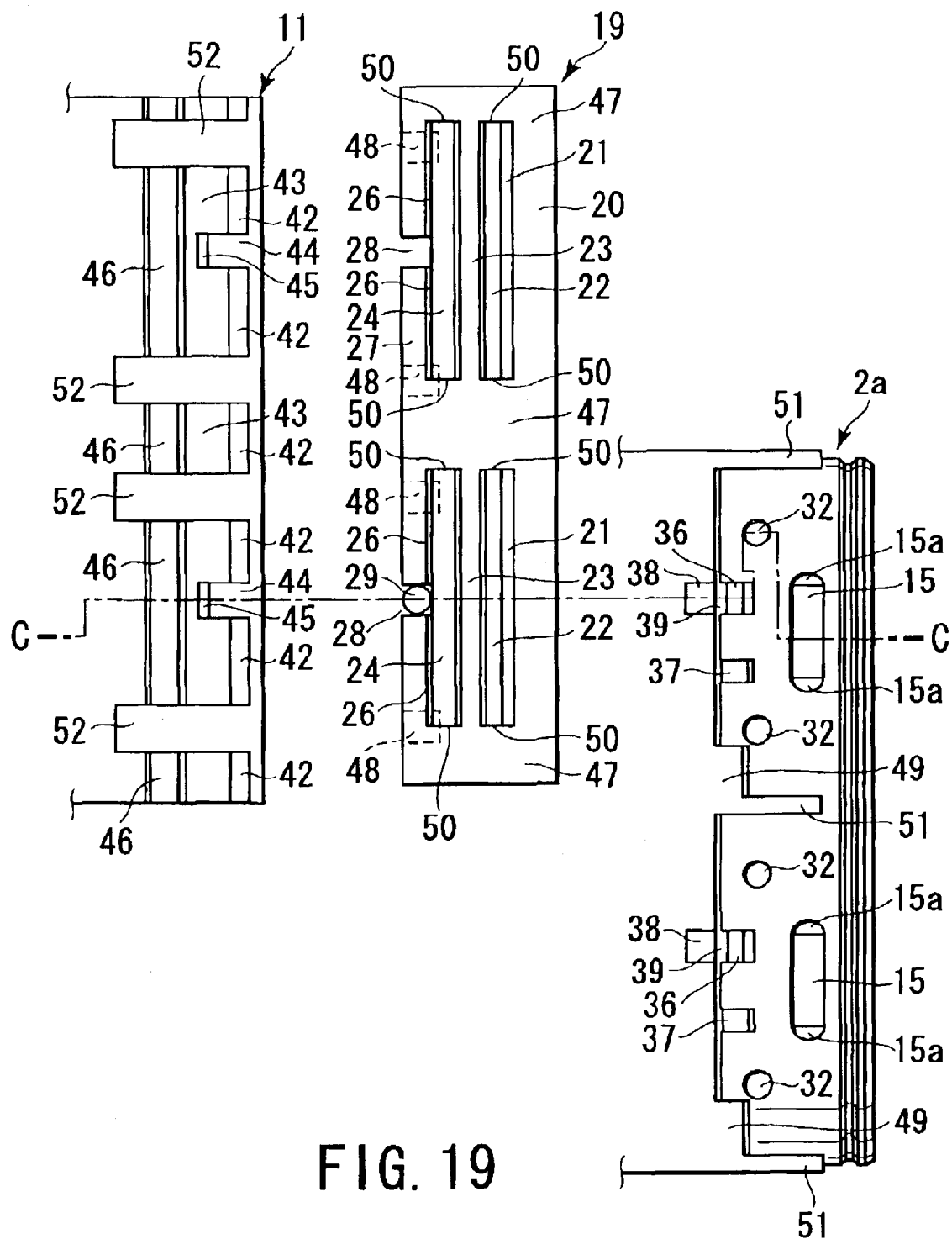
FIG. 19 is a development illustrating the socket body, valve control sleeve, and plug connecting sleeve, based on line C—C representing the positional relations between the cut position of FIG. 12, locking elements, first lock balls, and second lock balls.
Figure 20:
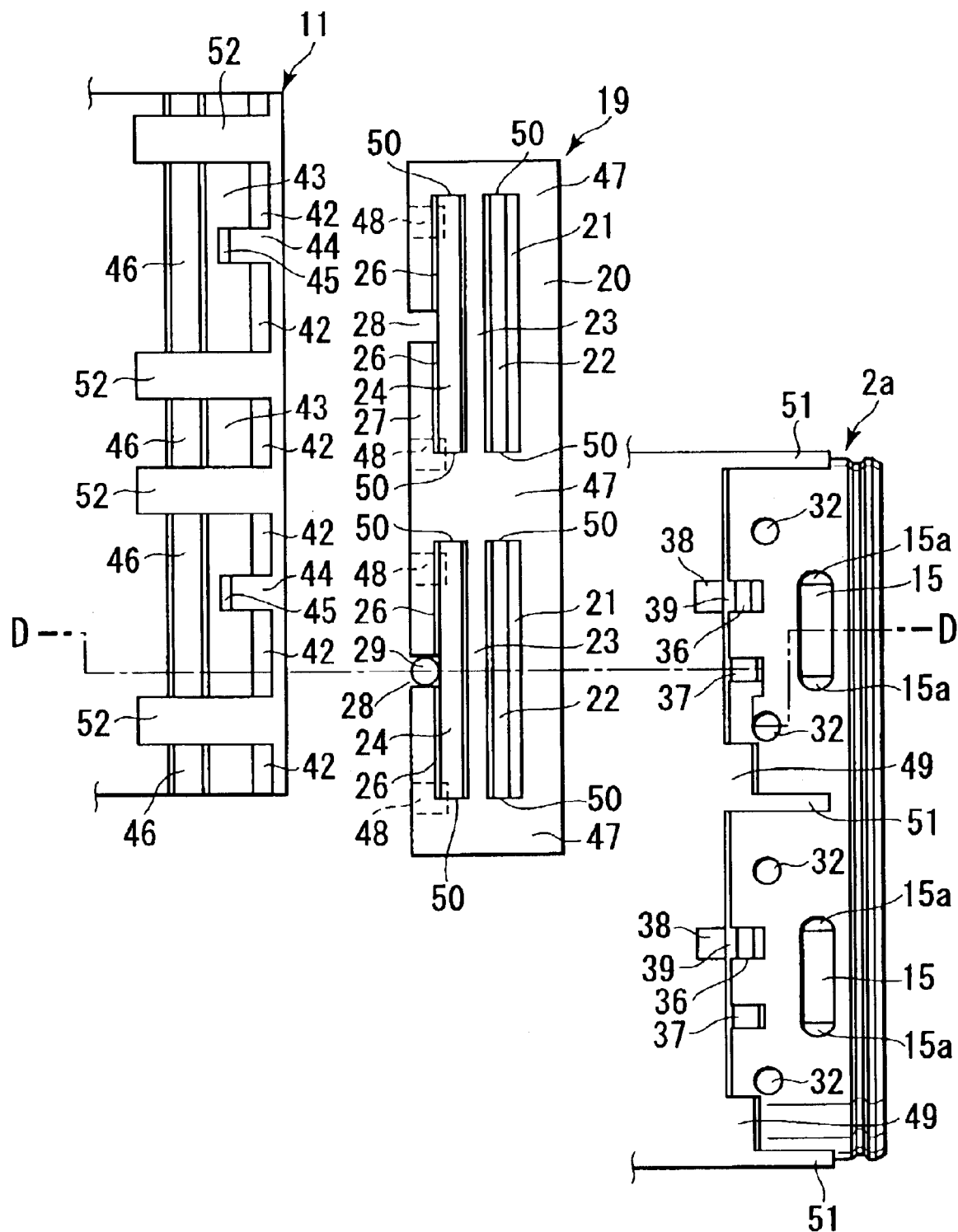
FIG. 20 is a development illustrating the socket body, valve control sleeve, and plug connecting sleeve, based on line D—D representing the positional relations between the cut positions of FIGS. 13 and 15, showing the state in which the valve control sleeve and the plug connecting sleeve of the pipe coupling socket shown in FIG. 12 are locked, locking elements, first lock balls, and second lock balls.
Figure 21:
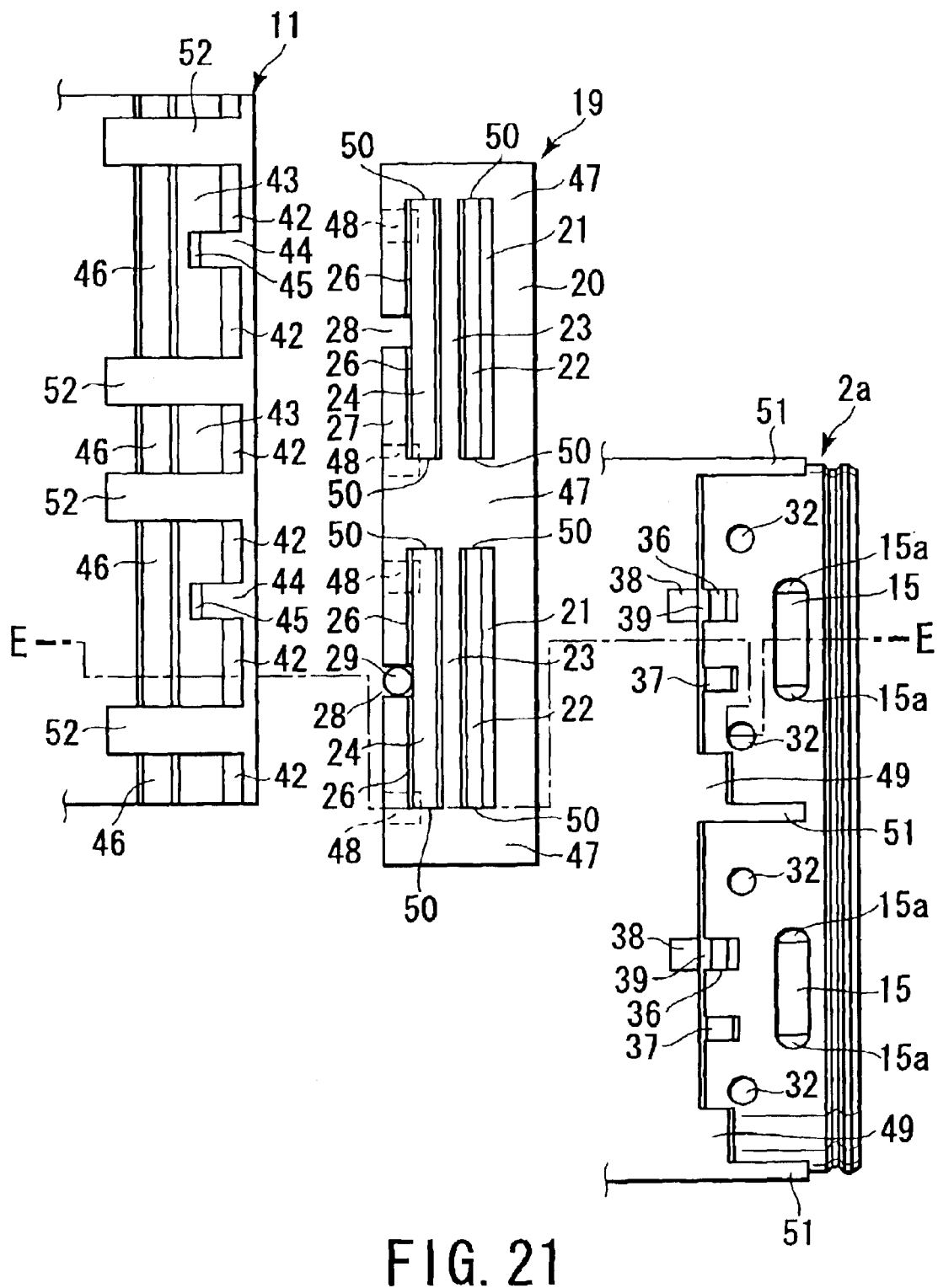
FIG. 21 is a development illustrating the socket body, valve control sleeve, and plug connecting sleeve, based on line E—E representing the positional relations between the cut positions of FIGS. 14 and 16, showing the state in which the valve control sleeve and the plug connecting sleeve of the pipe coupling socket shown in FIG. 12 are locked, locking elements, first lock balls, and second lock balls.

Thereupon, the plug connecting sleeve 19 is prevented again from retreating, and the valve control sleeve 11 is prevented from advancing by the first lock balls 29 that engage the first retaining step portions 42 (FIG. 7).

A second embodiment of the pipe coupling socket according to the present invention will now be described with reference to FIGS. 12 to 21. In the description of the present embodiment, like numerals are used to designate like portions that are shared with the first embodiment, and a description of those portions is omitted. The following is a description of different portions.

In the present embodiment, plug lock projections 22 on the inner peripheral surface of a plug connecting sleeve 19 and projections 24 located behind them are formed having engaging grooves 47 that regulate the rotation of the plug connecting sleeve 19. Further, a plurality of engaging protrusions 48 are arranged in the circumferential direction on the outer peripheral surface of the rear end of the plug connecting sleeve 19.

Further, engaging step portions 49 and rotation regulating step portions 51 are formed on the outer periphery of a small-outside-diameter cylinder portion 2a. Each engaging step portion 49 has a width substantially equal to the groove width of each engaging groove 47. When the plug connecting sleeve 19 is in its retreated position, the engaging step portions 49 individually engage the engaging grooves 47, thereby preventing the rotation of the plug connecting sleeve 19 in the circumferential direction and allowing the it to rotate in the axial direction only. When the plug connecting sleeve 19 is in its advanced position, the engaging step portions 49 are disengaged from the engaging grooves 47 and engage step portions 26 behind the projections 24, thereby preventing the retreat of the plug connecting sleeve 19 and allowing its rotation in the circumferential direction. The rotation regulating step portions 51 extend individually from the engaging step portions 49. When the plug connecting sleeve 19 is in the advanced position, the rotation regulating step portions 51 are situated individually in the engaging grooves 47, and engage sidewalls 50 of the engaging grooves 47 of the rotating plug connecting sleeve 19, thereby regulating the extent of its rotation.

If each rotation regulating step portion 51 engages one of the sidewalls 50, first lock balls 29 are fitted into the fitting recesses 36, individually. If each rotation regulating step portion 51 engages the other sidewall 50, the first lock balls 29 engage retaining recesses 37, individually.

Further, a valve control sleeve 11 has a convex portion 43 that extends in its circumferential direction on its distal end side. The convex portion 43 has tapered first retaining step portions 42. The first retaining step portions 42 are engaged by the first lock balls 29 and the engaging protrusions 48 that are arranged on the outer peripheral surface of the plug connecting sleeve 19 when the first lock balls 29 are disengaged from the fitting recesses 36 and situated on the centrifugal side with the plug connecting sleeve 19 in the advanced position.

The convex portion 43 is formed having slots 44, and besides, axially extending engaging slots 52 in which the engaging protrusions 48 are fitted. The engaging slots 52 communicate with a first lock ball engaging groove 46 that is formed in the inner peripheral surface of the valve control sleeve 11. If the plug connecting sleeve 19 in the advanced position is rotated, the engaging protrusions 48 moving in the inner parts of the engaging slots 52 transfer from the engaging slots 52 to the first lock ball engaging groove 46. Then, the engaging protrusions 48, along with the first lock balls 29, are fitted in the first lock ball engaging groove 46. The engaging slots 52 have the same function as the grooves 46a of the first embodiment.

The pipe coupling socket 1 of the second embodiment thus arranged and the plug 16 are connected to each other in the same manner as in the first embodiment.

As is evident from the above description, the pipe coupling socket of the present invention is provided with the lock means that prevents the advance and retreat of the valve control sleeve and the plug connecting sleeve. If the valve connection is partial, the advance of the plug connecting sleeve is prevented so that the valve cannot be opened by means of the valve control sleeve. Thus, the safety of the operation can be improved. Since the seal valve-seats can be prevented from being pressed to the ball valve under the fluid pressure, moreover, the durability of the annular rubber seal valve-seats and the perfection of the sealing can be ensured.

Although the present invention has been described in connection with the preferred embodiments with reference to the several drawings, it is to be understood that other similar embodiments may be used to fulfill the same functions of the invention or the aforementioned embodiments may be changed or supplemented without departing from the invention. Thus, the present invention should not be limited to any single embodiment, and it should be construed within the range or scope as defined by the appended claims.

What is claimed is:

1. A pipe coupling socket having a piping junction at one end thereof and a plug inlet at the other end, in which a piping passage and the plug inlet are internally connected by means of a through passage of a built-in ball valve, comprising:

a socket body having therein a valve chamber, one end of which communicates with the piping passage and the other end of which communicates with the plug inlet, the ball valve located for rotation in the valve chamber, and a valve control sleeve which is fitted on the outer periphery of the socket body and which advances to open the ball valve and retreats to close the ball valve;

a locking element which is supported on the distal end portion of the socket body for movement in the centripetal and centrifugal directions and engages an engaging groove formed on the outer periphery of a plug inserted in the plug inlet, thereby locking the plug;

a plug connecting sleeve which is fitted on the distal-side outer periphery of the socket body and which advances to move the locking element to the centripetal direction, thereby locking the plug, and retreats to allow the locking element to move to the centrifugal direction, thereby unlocking the plug;

first lock means which prevents the valve control sleeve from advancing when the plug connecting sleeve is situated in a retreated position; and second lock means which prevents the retreat of the plug connecting sleeve and the advance of the valve control sleeve when the plug connecting sleeve and the valve control sleeve are situated in an advanced position and a retreated position, respectively, and third lock means which prevents the retreat of the plug connecting sleeve and the valve control sleeve when the plug connecting sleeve and the valve control sleeve are situated in their respective advanced positions.

2. A pipe coupling socket according to claim 1, wherein the plug connecting sleeve is prevented from rotating in the circumferential direction and allowed to advance when in the retreated position, and is allowed to rotate in the circumferential direction to be prevented from retreating when in the advanced position, the rear end of the plug connecting sleeve having notches formed at given spaces in the circumferential direction, the notches being fitted with first lock balls for movement in the centripetal and centrifugal directions, the first lock balls moving back and forth as the plug connecting sleeve moves back and forth and moving in the circumferential direction with rotation; the outer peripheral surface of the socket body is formed having fitting recesses circumferentially fitted with the first lock balls of the plug connecting sleeve in the advanced position and having a depth for movement to the centripetal direction, the first lock balls being situated on the centripetal side when the first lock balls are fitted in the fitting recesses, the first lock balls being situated on the centrifugal side when the plug connecting sleeve is in the retreated position and when the plug connecting sleeve is situated in the advanced position and rotated so that the first lock balls are disengaged from the fitting recesses, the valve control sleeve in the retreated position being prevented from advancing when the plug connecting sleeve is in the retreated position in this state, and the valve control sleeve and the plug contacting sleeve being prevented from retreating when the plug connecting sleeve and the valve control sleeve are in the advanced position; the inner peripheral surface of the valve control sleeve has, on the distal end side thereof, a convex-portion which extends in the circumferential direction and has first retaining step portions which engage the first lock balls when the first lock balls are on the centrifugal side with the plug connecting sleeve in the advanced position, the convex portion is formed having moving grooves in positions corresponding to the fitting recesses in the outer peripheral surface of the socket body, depending on the distance covered by the movement of the plug connecting sleeve, the first lock balls in the centrifugal side being movable in the moving grooves, the moving grooves having, at the bottom thereof, second retaining step portions to which the first lock balls are anchored when the plug connecting sleeve is in the retreated position; the convex portion is formed further having a first lock ball engaging groove which extends in the circumferential direction behind the moving grooves and is engaged by the first lock balls when first lock balls are on the centrifugal side; the first lock balls on the centrifugal side and the second retaining step portions at the bottom of the moving grooves of the valve control sleeve constitute the first lock means; the first lock balls on the centrifugal side and the first retaining step portions of the valve control sleeve constitute the second lock means; the first lock balls on the centrifugal side and the first lock ball engaging groove of the valve control sleeve constitute the third lock means; and the effect of locking by the first, second, and third lock means is removed when the first lock balls are fitted in the fitting recesses in the outer peripheral surface of the socket body and situated on the centripetal side.

3. A pipe coupling socket according to claim 1, wherein the distal end portion of the socket body is fitted with a plurality of second lock balls which are arranged in the circumferential direction behind the locking element for movement in the centripetal and centrifugal directions, the socket body is fitted with a first collar for movement, the first collar in an advanced position supporting and situating the second lock balls on the centrifugal side in a manner such that a part of each second lock ball projects from the outer peripheral surface of the socket body and retreating to release the second lock balls from the support, thereby allowing the second lock balls to sink into the socket body, the first collar being urged in the advancing direction by means of a spring so that the first collar retreats as a plug is inserted therein; the plug connecting sleeve has, on the distal end side of the inner peripheral surface thereof, a plug unlocking recess which extends in the circumferential direction and allows the locking element to move to the centrifugal direction, the plug unlocking recess being followed in the circumferential direction by a taper step portion, which presses and moves the locking element to the centripetal direction, and a plug lock projection, which holds down moved to the centripetal direction, the plug lock projection being followed in the circumferential direction by a second lock ball engaging groove in which the second lock balls are fitted; the plug unlocking recess is situated in the position of the locking element and is allowed to move to the centrifugal direction of the locking element when the second lock balls are on the centrifugal side with the plug connecting sleeve in the retreated position, the second lock balls engaging the second lock ball engaging groove, thereby preventing the advance of the plug connecting sleeve; and the locking element moved to the centrifugal direction in the process of plug insertion engages a step portion at the bottom of the plug unlocking recess of the plug connecting sleeve so that the plug connecting sleeve can advance when the first collar retreats to allow the second lock balls to move to the centripetal direction and be disengaged from the second lock ball engaging groove as the plug is inserted further.

4. A pipe coupling socket according to claim 2, wherein the distal end portion of the socket body is fitted with a plurality of second lock balls which are arranged in the circumferential direction behind the locking element for movement in the centripetal and centrifugal directions, the socket body is fitted with a first collar for movement, the first collar in an advanced position supporting and situating the second lock balls on the centrifugal side in a manner such that a part of each second lock ball projects from the outer peripheral surface of the socket body and retreating to release the second lock balls from the support, thereby allowing the second lock balls to sink into the socket body, the first collar being urged in the advancing direction by means of a spring so that the first collar retreats as a plug is inserted therein; the plug connecting sleeve has, on the distal end side of the inner peripheral surface thereof, a plug unlocking recess which extends in the circumferential direction and allows the locking element to move to the centrifugal direction, the plug unlocking recess being followed in the circumferential direction by a taper step portion, which presses and moves the locking element to the centripetal direction, and a plug lock projection, which holds down moved to the centripetal direction, the plug lock projection being followed in the circumferential direction by a second lock ball engaging groove in which the second lock balls are fitted; the plug unlocking recess is situated in the position of the locking element and is allowed to move to the centrifugal direction of the locking element when the second lock balls are on the centrifugal side with the plug connecting sleeve in the retreated position, the second lock balls engaging the second lock ball engaging groove, thereby preventing the advance of the plug connecting sleeve; and the locking element moved to the centrifugal direction in the process of plug insertion engages a step portion at the bottom of the plug unlocking recess of the plug connecting sleeve so that the plug connecting sleeve can advance when the first collar retreats to allow the second lock balls to move to the centripetal direction and be disengaged from the second lock ball engaging groove as the plug is inserted further.

5. A pipe coupling socket according to claim 1, wherein the respective openings of the piping passage of the piping junction and the plug inlet, which open on the valve chamber side of the socket body, are provided individually with annular rubber seal valve-seats which coaxially face each other across the through passage of the ball valve in an open position and are elastically pressed to the outer peripheral wall of the ball valve, the openings being further provided individually with stoppers which prevent the annular rubber seal valve-seats from being pressed to the ball valve under an internal fluid pressure.

6. A pipe coupling socket according to claim 2, wherein the respective openings of the piping passage of the piping junction and the plug inlet, which open on the valve chamber side of the socket body, are provided individually with annular rubber seal valve-seats which coaxially face each other across the through passage of the ball valve in an open position and are elastically pressed to the outer peripheral wall of the ball valve, the openings being further provided individually with stoppers which prevent the annular rubber seal valve-seats from being pressed to the ball valve under an internal fluid pressure.

7. A pipe coupling socket according to claim 3, wherein the respective openings of the piping passage of the piping junction and the plug inlet, which open on the valve chamber side of the socket body, are provided individually with annular rubber seal valve-seats which coaxially face each other across the through passage of the ball valve in an open position and are elastically pressed to the outer peripheral wall of the ball valve, the openings being further provided individually with stoppers which prevent the annular rubber seal valve-seats from being pressed to the ball valve under an internal fluid pressure.

8. A pipe coupling socket according to claim 4, wherein the respective openings of the piping passage of the piping junction and the plug inlet, which open on the valve chamber side of the socket body, are provided individually with annular rubber seal valve-seats which coaxially face each other across the through passage of the ball valve in an open position and are elastically pressed to the outer peripheral wall of the ball valve, the openings being further provided individually with stoppers which prevent the annular rubber seal valve-seats from being pressed to the ball valve under an internal fluid pressure.

* * * * *